(12) United States Patent
Murthy

(10) Patent No.: US 10,991,006 B2
(45) Date of Patent: Apr. 27, 2021

(54) BEACON BASED CAMPAIGN MANAGEMENT

(71) Applicant: Kellogg Company, Battle Creek, MI (US)

(72) Inventor: Ganapa Sashidhara Murthy, Portage, MI (US)

(73) Assignee: Kellogg Company, Battle Creek, MI (US)

( * ) Notice: Subject to any disclaimer, the term of this patent is extended or adjusted under 35 U.S.C. 154(b) by 37 days.

(21) Appl. No.: 16/442,607

(22) Filed: Jun. 17, 2019

(65) Prior Publication Data
US 2019/0303969 A1    Oct. 3, 2019

Related U.S. Application Data

(63) Continuation of application No. 14/700,989, filed on Apr. 30, 2015, now Pat. No. 10,366,416.

(51) Int. Cl.
*G06Q 30/00* (2012.01)
*G06Q 30/02* (2012.01)
(Continued)

(52) U.S. Cl.
CPC ..... *G06Q 30/0257* (2013.01); *G06Q 30/0261* (2013.01); *G06Q 30/0267* (2013.01);
(Continued)

(58) Field of Classification Search
CPC .......... G06Q 30/0257; G06Q 30/0261; G06Q 30/0267; G06Q 30/0207–0277; H04L 12/1859; H04L 51/24; H04L 51/38
See application file for complete search history.

(56) References Cited

U.S. PATENT DOCUMENTS 7,178,722 B2   2/2007   Do et al.
7,403,788 B2   7/2008   Trioano et al.
(Continued)

FOREIGN PATENT DOCUMENTS

CA   2493303 A1   1/2004
CA   2688210 A1   12/2008
(Continued)

OTHER PUBLICATIONS

Hosbond, et al. "Micro Mobility Marketing: Two Cases on Location-Based Supermarket Shopping Trolleys." Journal of Targeting, Measurement, and Analysis for Marketing, vol. 16, No. 1, pp. 68-77. (Year: 2007).*

(Continued)

*Primary Examiner* — Luis A Brown
(74) *Attorney, Agent, or Firm* — Honigman LLP; Brett A. Krueger

(57) ABSTRACT

A method for transmitting a campaign notification message to a shopper mobile computing device includes receiving a condition set from a computing device corresponding to a user for generating the campaign notification message. The condition set includes a defined campaign type, at least one proximity detection device activated by the user and at least one proximity-based delivery parameter indicating campaign content related to the defined campaign type, wherein the campaign content is associated with a corresponding range of proximities in relation to the activated proximity detection device. The method also includes receiving proximity information from the shopper mobile computing device indicating a proximity of the shopper mobile computing device in relation to the activated proximity detection device. The method also includes generating the campaign notification message based on the received condition set and the received proximity information and transmitting the (Continued)

campaign notification message to the mobile computing device.

20 Claims, 11 Drawing Sheets

(51) Int. Cl.
*H04L 12/58* (2006.01)
*H04L 12/18* (2006.01)

(52) U.S. Cl.
CPC .......... *H04L 12/1859* (2013.01); *H04L 51/24* (2013.01); *H04L 51/38* (2013.01)

(56) References Cited

U.S. PATENT DOCUMENTS

| | | | |
|---|---|---|---|
| 7,606,918 B2 | 10/2009 | Holzman et al. | |
| 7,792,518 B2 | 9/2010 | Trioano et al. | |
| 7,930,204 B1* | 4/2011 | Sharma | G06Q 30/0203 705/7.32 |
| 8,009,863 B1* | 8/2011 | Sharma | G06K 9/00335 382/100 |
| 8,010,987 B2 | 8/2011 | Nygaard et al. | |
| 8,035,491 B2* | 10/2011 | Banks | H04W 52/0209 340/286.02 |
| 8,126,478 B2 | 2/2012 | Northway et al. | |
| 8,131,262 B2 | 3/2012 | Trioano et al. | |
| 8,214,738 B2 | 7/2012 | Othmer et al. | |
| 8,219,925 B2 | 7/2012 | Othmer et al. | |
| 8,274,396 B2* | 9/2012 | Gurley | G01S 11/02 340/686.1 |
| 8,281,027 B2 | 10/2012 | Martinez et al. | |
| 8,295,851 B2 | 10/2012 | Finnegan et al. | |
| 8,437,784 B2 | 5/2013 | Trioano et al. | |
| 8,510,163 B2 | 8/2013 | Hess et al. | |
| 8,548,493 B2 | 10/2013 | Rieger, III | |
| 8,583,475 B2 | 11/2013 | Wills | |
| 9,460,590 B2* | 10/2016 | Argue | G07G 1/0036 |
| 9,465,369 B2* | 10/2016 | Saha | H04L 12/2818 |
| 9,984,381 B2* | 5/2018 | Burkhart | G06K 7/10009 |
| 10,657,561 B1* | 5/2020 | Aravind | G06Q 30/0267 |
| 2003/0006911 A1 | 1/2003 | Smith et al. | |
| 2003/0013460 A1 | 1/2003 | Papadias et al. | |
| 2004/0103028 A1* | 5/2004 | Littman | G06Q 30/0267 705/14.52 |
| 2005/0209921 A1 | 9/2005 | Roberts et al. | |
| 2006/0131401 A1* | 6/2006 | Do | G06Q 20/201 235/383 |
| 2006/0136546 A1 | 6/2006 | Trioano et al. | |
| 2006/0236258 A1 | 10/2006 | Othmer et al. | |
| 2007/0278299 A1* | 12/2007 | Overhultz | G06Q 30/02 235/383 |
| 2007/0288310 A1 | 12/2007 | Boos et al. | |
| 2008/0045234 A1 | 2/2008 | Reed | |
| 2008/0059297 A1* | 3/2008 | Vallier | G06Q 30/02 705/14.27 |
| 2008/0074264 A1* | 3/2008 | Sharpe | G06Q 30/02 340/572.1 |
| 2008/0140434 A1 | 6/2008 | O'Brien | |
| 2008/0155453 A1 | 6/2008 | Othmer | |
| 2008/0177616 A1 | 7/2008 | Nemirofsky et al. | |
| 2008/0281687 A1* | 11/2008 | Hurwitz | G06Q 30/0271 705/14.1 |
| 2008/0281910 A1 | 11/2008 | Trioano et al. | |
| 2009/0076912 A1 | 3/2009 | Rajan et al. | |
| 2009/0132378 A1 | 5/2009 | Othmer et al. | |
| 2009/0150211 A1 | 6/2009 | Bayne | |
| 2009/0184843 A1* | 7/2009 | Shaffer | G08G 1/096716 340/933 |
| 2010/0042469 A1* | 2/2010 | Chandrasekar | G06Q 30/0256 705/14.54 |
| 2010/0073148 A1* | 3/2010 | Banks | H04L 1/1867 340/286.02 |
| 2010/0077017 A1 | 3/2010 | Martinez et al. | |
| 2010/0151821 A1* | 6/2010 | Sweeney | H04W 4/02 455/410 |
| 2010/0211431 A1* | 8/2010 | Lutnick | G06Q 50/34 705/14.12 |
| 2010/0269059 A1 | 10/2010 | Othmer et al. | |
| 2011/0025816 A1 | 2/2011 | Brewer et al. | |
| 2011/0060652 A1* | 3/2011 | Morton | G06Q 20/3224 705/14.58 |
| 2011/0086617 A1 | 4/2011 | Trioano et al. | |
| 2011/0093339 A1* | 4/2011 | Morton | G06Q 30/02 705/14.58 |
| 2011/0099070 A1 | 4/2011 | Eliason | |
| 2011/0112892 A1* | 5/2011 | Tarantino | G07F 17/32 705/14.1 |
| 2011/0119132 A1* | 5/2011 | Morton | G06Q 30/0261 705/14.53 |
| 2011/0185354 A1 | 7/2011 | Tanner et al. | |
| 2011/0208589 A1 | 8/2011 | Garg | |
| 2011/0231236 A1* | 9/2011 | Gonzalez | G06Q 30/0238 705/14.25 |
| 2011/0320259 A1 | 12/2011 | Roumeliotis et al. | |
| 2012/0022930 A1* | 1/2012 | Brouhard | G06Q 30/0229 705/14.22 |
| 2012/0022931 A1 | 1/2012 | Syed et al. | |
| 2012/0022944 A1* | 1/2012 | Volpi | G06Q 30/0255 705/14.53 |
| 2012/0029691 A1* | 2/2012 | Mockus | G06Q 20/3224 700/232 |
| 2012/0047011 A1 | 2/2012 | Rippetoe et al. | |
| 2012/0123848 A1 | 5/2012 | Trioano et al. | |
| 2012/0185335 A1* | 7/2012 | Tsirtsis | G06F 16/9537 705/14.64 |
| 2012/0197705 A1* | 8/2012 | Mesaros | G06Q 30/0641 705/14.23 |
| 2012/0245969 A1 | 9/2012 | Campbell | |
| 2012/0250540 A1 | 10/2012 | Smartt et al. | |
| 2012/0253920 A1 | 10/2012 | Yarvis et al. | |
| 2012/0256968 A1 | 10/2012 | Othmer et al. | |
| 2012/0257336 A1 | 10/2012 | Wolff, Jr. | |
| 2012/0264447 A1 | 10/2012 | Rieger, III | |
| 2012/0276884 A1 | 11/2012 | Othmer | |
| 2013/0006754 A1* | 1/2013 | Horvitz | G06Q 30/0251 705/14.43 |
| 2013/0036023 A1 | 2/2013 | Koplovitz et al. | |
| 2013/0065584 A1 | 3/2013 | Lyon et al. | |
| 2013/0085873 A1 | 4/2013 | Garcia Puga et al. | |
| 2013/0210461 A1* | 8/2013 | Moldavsky | G06Q 30/0267 455/456.3 |
| 2013/0238438 A1 | 9/2013 | Trioano et al. | |
| 2013/0247166 A1 | 9/2013 | Freedman et al. | |
| 2013/0297422 A1 | 11/2013 | Hunter et al. | |
| 2013/0331124 A1 | 12/2013 | Rieger, III | |
| 2014/0006329 A1 | 1/2014 | Hu et al. | |
| 2014/0013271 A1 | 1/2014 | Moore et al. | |
| 2014/0040001 A1 | 2/2014 | Harvey et al. | |
| 2014/0073289 A1 | 3/2014 | Velasco | |
| 2014/0180817 A1* | 6/2014 | Zilkha | G06Q 30/0239 705/14.55 |
| 2014/0222956 A1* | 8/2014 | Courtney, III | H04L 67/2823 709/217 |
| 2015/0058129 A1* | 2/2015 | Nevid | G06Q 30/0267 705/14.64 |
| 2015/0269600 A1* | 9/2015 | Randle | G06Q 30/0207 705/14.14 |
| 2016/0019515 A1* | 1/2016 | Milne | G06Q 30/0639 705/20 |
| 2017/0094484 A1* | 3/2017 | Li | H04H 60/52 |

FOREIGN PATENT DOCUMENTS

| | | |
|---|---|---|
| CN | 101681480 A | 3/2010 |
| CN | 102882637 A | 1/2013 |
| EP | 2171856 A1 | 4/2010 |
| EP | 2174273 A2 | 4/2010 |
| EP | 2606410 A2 | 6/2013 |
| JP | 2002259253 A | 9/2002 |

(56) References Cited

FOREIGN PATENT DOCUMENTS

| | | |
|---|---|---|
| KR | 2010025578 | 3/2010 |
| KR | 2011130530 | 12/2011 |
| KR | 2012115595 | 10/2012 |
| KR | 2012063559 | 6/2015 |
| RU | 2010101668 A | 7/2011 |
| WO | 2004010257 A2 | 1/2004 |
| WO | 2006109088 A1 | 10/2006 |
| WO | 2008157806 A2 | 12/2008 |
| WO | 2011123245 A1 | 10/2011 |
| WO | 2012097423 A1 | 7/2012 |
| WO | 2013066499 A2 | 5/2013 |
| WO | 2013090465 A1 | 6/2013 |
| WO | 2013090694 A1 | 6/2013 |
| WO | 2013106870 A1 | 7/2013 |
| WO | 2013117253 A1 | 8/2013 |
| WO | 2013148470 A1 | 10/2013 |
| WO | 2013192443 A1 | 12/2013 |
| WO | 2014014572 A2 | 1/2014 |
| WO | 2014020622 A1 | 2/2014 |
| WO | 2014036320 A1 | 3/2014 |

OTHER PUBLICATIONS

International Search Report and Written Opininon for Application No. PCT/US2016/029115 dated Aug. 8, 2016.
Office Action, Canadian Application No. 2983450, dated Aug. 21, 2018, 4 pages.
Examination Report, Application No. 2016255414, dated Sep. 28, 2018, 3 pages.

\* cited by examiner

BEACON BASED CAMPAIGN MANAGEMENT

CROSS REFERENCE TO RELATED APPLICATION

This U.S. patent application is a continuation of, and claims priority under 35 U.S.C. § 120 from, U.S. patent application Ser. No. 14/700,989, filed on Apr. 30, 2015. The disclosure of this prior application is considered part of the disclosure of this application and is hereby incorporated by reference in its entirety.

TECHNICAL FIELD

This disclosure relates to location based marketing campaigns.

BACKGROUND

Software applications have been developed by retailers, manufacturers and marketers to allow shoppers to use capabilities of their mobile computing devices to enhance their shopping experience for purchasing anything from electronic devices to simple groceries. For instance, these applications can be tailored to deliver promotional information related to products when a shopper sets foot in a facility. Notification messages may be sent to shoppers upon arrival at a shopping facility to inform the shoppers of exciting offers. Delivery of the notification messages, however, may be ineffective when the shopper does not have their mobile computing device turned on upon arrival. The shoppers may still have to manually search for the exciting offers within the facility after receiving the notification message.

Components of mobile computing devices are increasingly becoming more advanced. For instance, Bluetooth low energy (BLE) devices may be utilized to monitor signals transmitted from a Bluetooth transmitter located within a shopping facility for estimating the location of the mobile computing device corresponding to the shopper within the facility. Examples of other mobile computing device components include Global Positioning System (GPS) devices that can monitor and track locations, near field communication (NFC) devices that can transmit and receive radio frequency communications and camera devices that allow the mobile computing device to capture and scan images using dedicated software.

SUMMARY

A method for transmitting a campaign notification message to a shopper mobile computing device includes receiving, at a processing device of a campaign management server, a condition set from a computing device corresponding to a user for generating the campaign notification message. The condition set includes a defined campaign type, identification of at least one proximity detection device activated by the user, and at least one proximity-based delivery parameter indicating campaign content related to the defined campaign type. The campaign content is associated with a corresponding range of proximities in relation to the activated proximity detection device. The method also includes receiving, at the processing device, proximity information from the shopper mobile computing device indicating a proximity of the shopper mobile computing device in relation to the activated proximity detection device. The method also includes generating, at the processing device, the campaign notification message based on the received condition set and the received proximity information and transmitting the campaign notification message from the processing device to the mobile computing device.

Implementations of the disclosure may include one or more of the following optional features. In some implementations, the defined campaign type, selected by the user, indicates a promotional campaign corresponding to at least one advertisement used to promote a product offered for sale within the facility. In some implementations, the defined campaign type, selected by the user, indicates a survey campaign corresponding to at least one inquiry requested by the user soliciting a response from shoppers within the facility. In some examples, the defined campaign type selected by the user indicates a ratings campaign corresponding to an inquiry by the user requesting shoppers to assess a specific product being offered for sale. In some implementations, the defined campaign type selected by the user indicates an entertainment campaign indicating at least one of interactive games or contests for participation by the shoppers.

In some examples, the campaign content related to the defined campaign type indicated by the proximity-based delivery parameter includes at least one of a message header, a message description, item information, a coupon, a survey inquiry, a ratings inquiry, interactive content, or a product image. In some implementations, the at least one proximity-based delivery parameter includes at least two proximity-based delivery parameters including a first proximity-based delivery parameter indicating corresponding campaign content associated with a corresponding first range of proximities in relation to the activated proximity detection device, and a second proximity-based delivery parameter indicating corresponding campaign content associated with a corresponding second range of proximities in relation to the activated proximity detection device, wherein the second range of proximities is greater than the first range of proximities. In other implementations, the at least two proximity-based delivery parameters further includes a third proximity-based delivery parameter indicating corresponding campaign content associated with a corresponding third range of proximities in relation to the activated proximity detection device, wherein the third range of proximities is greater than the first and second ranges of proximities. In some implementations, the condition set further includes a delivery schedule indicating a time period at which the campaign notification message is generated by the processing device and transmitted to the shopper mobile computing device.

In some implementations, the processing device stores the condition set received from the computing device in a non-transitory campaign data store (e.g., database), retrieves the campaign content associated with the corresponding range of proximities that includes the proximity of the shopper mobile computing device in relation to the activated proximity detection device in response to the proximity information received from the shopper mobile computing device, and generates the campaign notification message for the defined campaign type using the retrieved campaign content.

In some examples, the campaign notification message transmitted from the processing device is displayed in a graphical user interface executed by the shopper mobile computing device. The campaign notification message displayed in the graphical user interface may include an interactive graphic operative to receive an input by the shopper. For example, the interactive graphic may include an electronic coupon related to a product offered for sale within the facility, the electronic coupon stored within a non-transitory offer data store (e.g., database) of the shopper mobile computing device. In another example, the interactive graphic may include a set of answers related to an inquiry requested by the user. In yet another example, the interactive graphic may include a rating selection for a specific product being offered for sale related to an inquiry by the user requesting the shopper to assess the specific product.

In some implementations, the processing device receives feedback information from the shopper mobile computing device. For example, the feedback information may include a shopper response to the transmitted campaign notification. In another example, the feedback information may include a time stamp indicating when the campaign notification message was transmitted. In yet another example, the feedback information may include demographic information related to the shopper.

Another aspect of the disclosure provides a campaign management system including one or more campaign management processing devices executing a campaign manager and a proximity detection device (PDD) manager. The campaign manager receives a condition set from a computing device corresponding to a user for generating a campaign notification message. The condition set includes a defined campaign type selected by the user, identification of at least one proximity detection device located within a facility and activated by the user, wherein the activated PDD is configured to detect a proximity of a shopper mobile computing device corresponding to a shopper, and at least one proximity-based delivery parameter indicating campaign content related to the defined campaign type and selected by the user, wherein the campaign content is associated with a corresponding range of proximities in relation to the activated proximity detection device. The PDD manager receives proximity information from the shopper mobile computing device. The proximity information indicates a proximity of the shopper mobile computing device in relation to the activated proximity detection device. The campaign management server also generates the campaign notification message based upon the condition set received from the computing device and the proximity information received from the shopper mobile computing device and transmits the campaign notification message to the shopper mobile computing device.

In some implementations, the defined campaign type of the condition set received by the campaign manager indicates one of the following campaign types, including a promotional campaign corresponding to at least one advertisement used to promote a product offered for sale within the facility, a survey campaign corresponding to at least one inquiry requested by the user soliciting a response from shoppers within the facility, a ratings campaign corresponding to an inquiry by the user requesting shoppers to assess a specific product being offered for sale, and an entertainment campaign indicating at least one of interactive games or contests for participation by the shoppers. In some implementations, the campaign content for the defined campaign type indicated by the proximity-based delivery parameter includes at least one of a message header, a message description, item information, a coupon, a survey inquiry, a ratings inquiry, interactive content, or a product image.

The campaign manager may receive at least two proximity-based delivery parameters of the condition set including a first proximity-based delivery parameter indicating corresponding campaign content associated with a corresponding first range of proximities in relation to the activated proximity detection device and a second proximity-based delivery parameter indicating corresponding campaign content associated with a corresponding second range of proximities in relation to the activated proximity detection device, wherein the second range of proximities is greater than the first range of proximities. In other implementations, the at least two proximity-based delivery parameters of the condition set received by the campaign manager further includes a third proximity-based delivery parameter indicating corresponding campaign content associated with a corresponding third range of proximities in relation to the activated proximity detection device, wherein the third range of proximities is greater than the first and second ranges of proximities. In some implementations, the condition set received by the campaign manager further includes a delivery schedule indicating a time period at which the campaign management server generates and transmits the campaign notification message to the shopper mobile computing device.

In some implementations, the system further includes a non-transitory campaign data store (e.g., database) in communication with the one or more campaign management server processing devices. In some examples, the campaign data store stores the condition set received by the campaign manager. In some implementations, the system further includes a non-transitory proximity detection device data store (e.g., database) in communication with the one or more campaign management processing devices. In some examples, the proximity detection device data store stores a configuration of all proximity detection devices furnished by one or more facilities that indicates at least one of a facility location, a battery level, or an activation status for each of the proximity detection devices. In some implementations, the system further includes a non-transitory offer data store (e.g., database) in communication with the shopper mobile computing device. In some examples, the offer data store stores campaign content of the campaign notification message transmitted to the mobile computing device from the campaign manager.

In some implementations, the system further includes a graphical user interface executed by the shopper mobile computing device. The graphical user interface may display the campaign notification message transmitted to the mobile computing device from the campaign manager.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
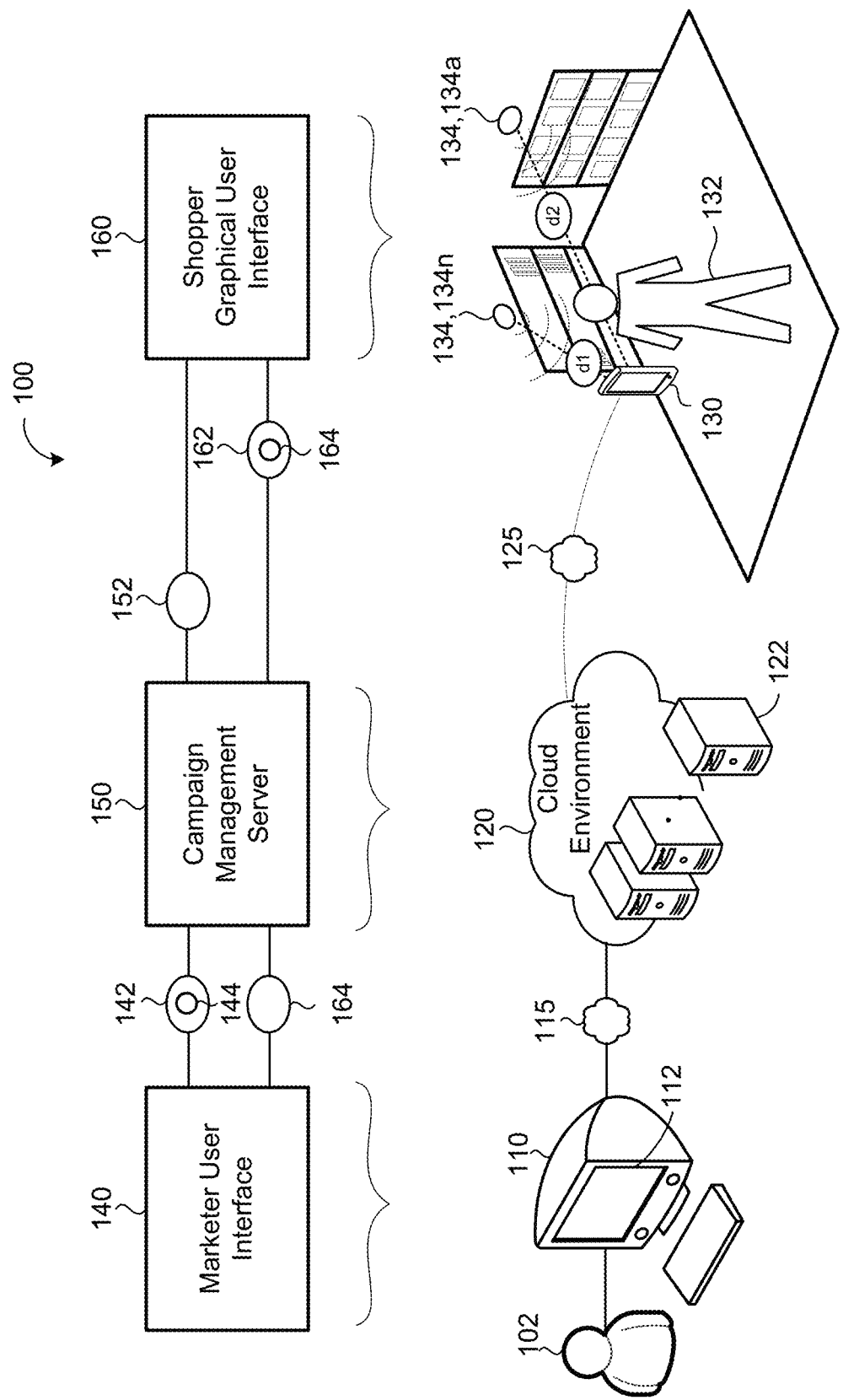
FIG. 1 is a schematic view of an exemplary marketing campaign environment, where a marketer uses a campaign management server to set conditions for transmitting campaign notification messages to a shopper mobile computing device.
Figure 6:
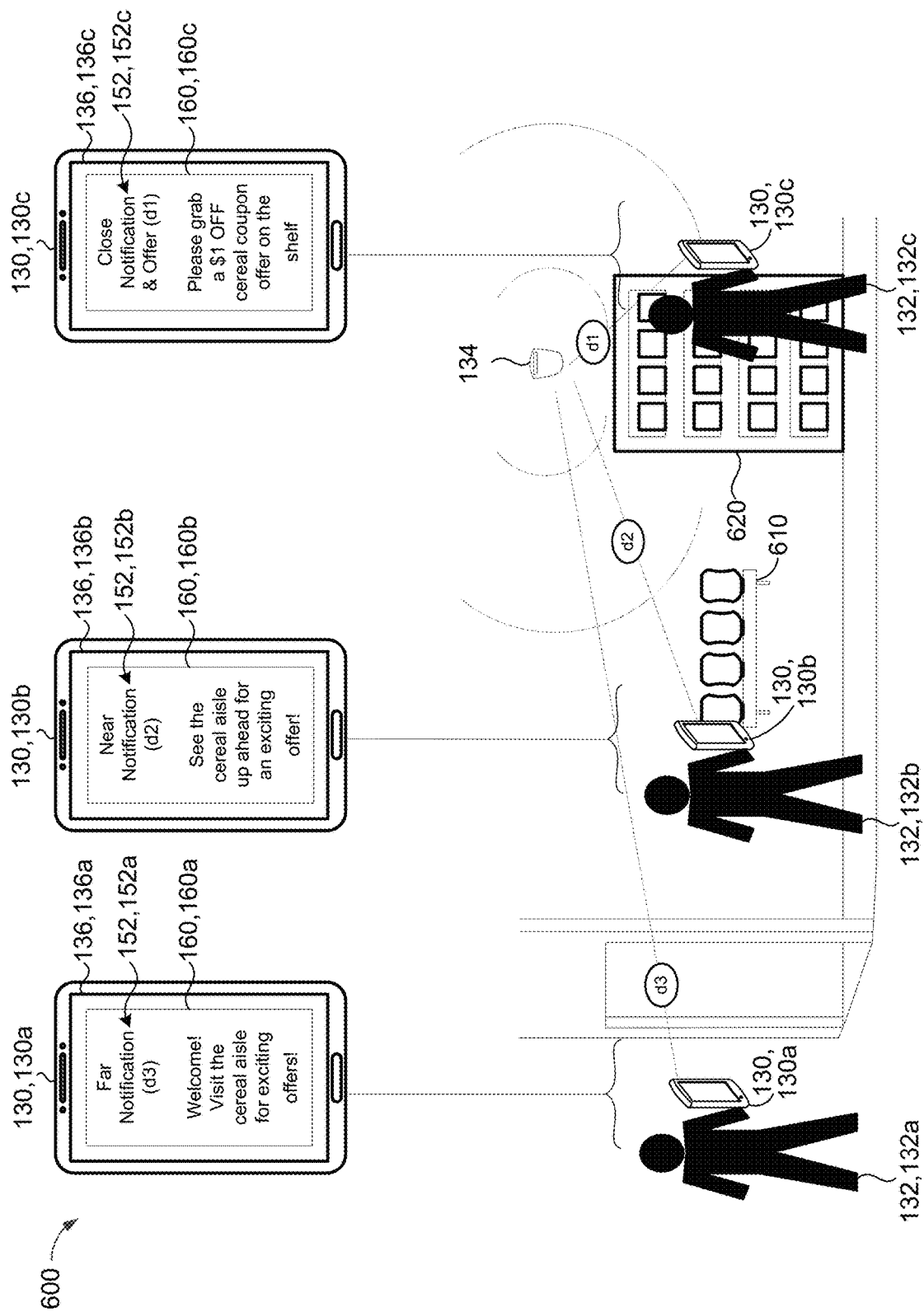
FIG. 6 is a schematic view of an exemplary shopping environment, where a shopper mobile computing device displays a message notification based upon a proximity of the shopper mobile computing device in relation to a proximity detection device.
Figure 7:
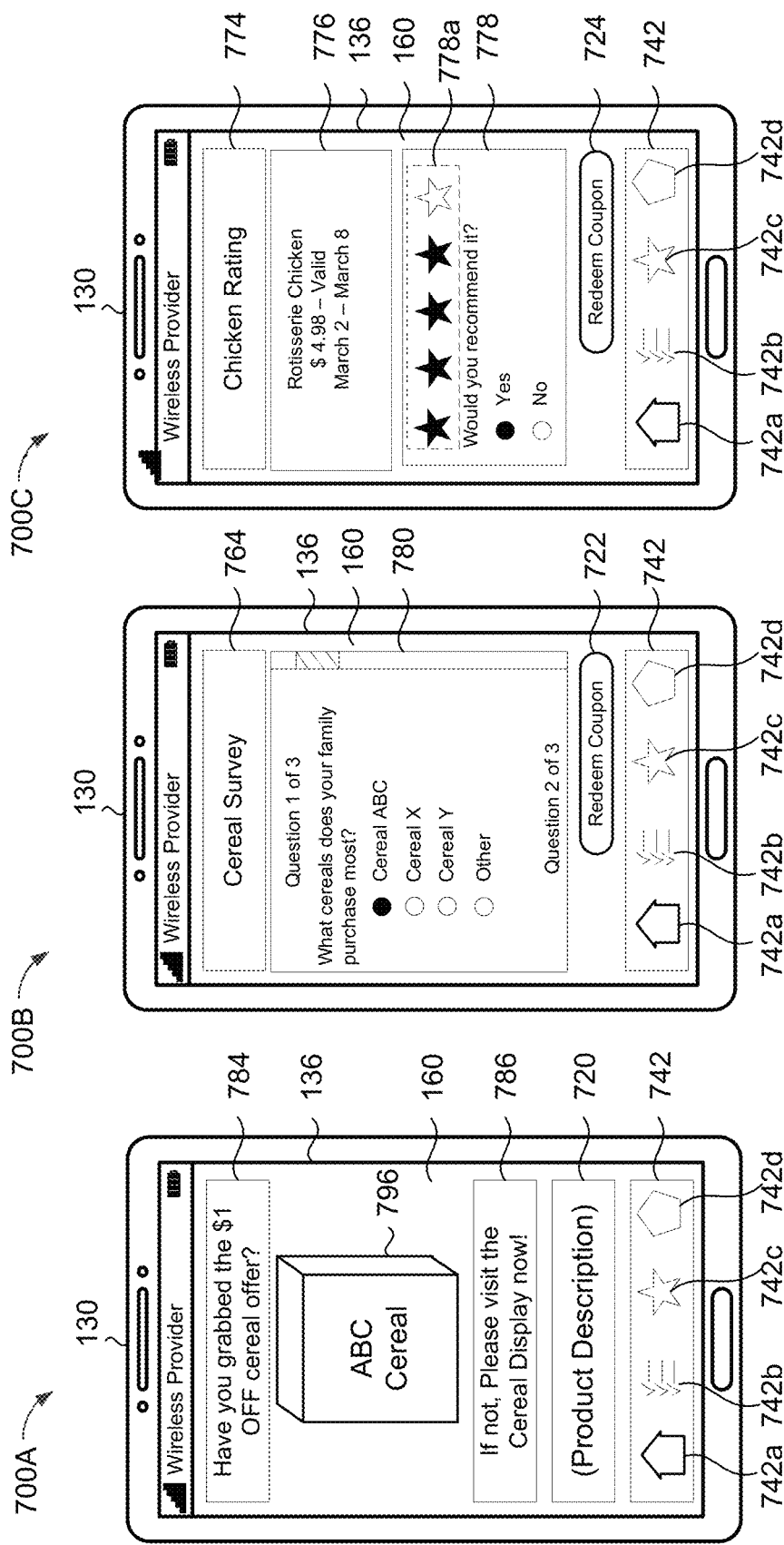
FIGS. 7A-7C are schematic views of exemplary notification messages displayed upon a graphical user interface of a shopper mobile computing device.

Referring to FIG. 1, in some implementations, a marketing campaign environment 100 includes a user 102 (e.g., a marketer) interfacing with a computing device 110 (e.g., a computer, laptop, etc.) executing a marketer user interface (UI) 140 on a display 112. The computing device 110 is in communication with a cloud computing environment 120 (i.e., cloud) via a network 115 to use a campaign management server 150 executing in the cloud environment 120 to set a condition set 142 for transmitting a campaign notification message 152 to a shopper mobile computing device 130 via a network 125. The mobile computing device 130 corresponds to a shopper 132 and executes a shopper graphical user interface (GUI) 160 in a display 136 (FIGS. 6 and 7).

In some implementations, the user 102 refers to a marketer that sells goods or services in or to a market. In some examples, the user 102 refers to a marketer for a retailer of goods or services within one or more facilities furnished by a retailer. In some examples, the user 102 refers to a marketer for a manufacturer of goods for sale within one or more facilities furnished by one or more retailers. The term "facility" can refer to shopping venues, complexes and department stores.

The cloud 120 provides elastic/scalable cloud computing and/or cloud storage capabilities. Cloud computing may provide Internet-based computing, whereby shared servers 122 provide resources, software, and data to computers and other devices on demand. For example, the cloud 120 may be a cloud computing service that includes at least one server computing device 122, which may include a service abstraction layer and a hypertext transfer protocol wrapper over a server virtual machine instantiated thereon. The server computing device 122 may be configured to parse HTTP requests and send HTTP responses. Cloud computing may be a technology that uses the Internet and central remote servers to maintain data and applications. Cloud computing can allow users 102 and shoppers 132 to access and use applications, such as the campaign management server 150, without installation to and access of personal files at any computer with internet access. Cloud computing allows for relatively more efficient computing by centralizing storage, memory, processing and bandwidth. The cloud 120 can provide scalable, on-demand computing power, storage, and bandwidth, while reducing user hardware requirements (e.g., by freeing up central processing unit (CPU) and memory usage).

In the example shown, the shopper 132 is within a facility furnished by a retailer that includes products being offered for sale. A retailer may furnish proximity detection devices (PDDs) 134a-n that may be distributed at desired locations within the facility. For instance, the PDDs 134a-n can be located on product display shelves, shopping aisles, point-of-sales, entrances and exits of facilities. Implementations herein are directed toward using each PDD 134a-n to detect a proximity of the mobile computing device 130 and using the campaign management server 150 to infer a location of the shopper 132 within the facility based on the detected proximity. In the example shown, the PDD 134a detects a proximity, or distance (d2), to the mobile computing device 130 and the PDD 134n detects a proximity, or distance (d1), to the mobile computing device 130. Each of the PDDs 134a-n may transmit wireless signals that are received by the mobile computing device 130 to detect the proximity thereof. The mobile computing device 130 executing the GUI 160 is in communication with the cloud computing environment 120 (i.e., cloud) via the network 125 to transmit proximity information 162 to the campaign management server 150 that indicates the proximity (e.g., d1 and/or d2) of the mobile computing device 130 in relation to the corresponding PDD 134a-n. Accordingly, a location of the shopper 132 within the facility may be inferred based upon proximity information 162. In some examples, the proximity information 162 further includes a PDD identifier, status of the corresponding PDD 134a-n and a shopper identifier corresponding to the shopper 132.

In some implementations, the mobile computing device 132 has a dedicated software application for communicating with the campaign management server 150. In some examples, the shopper 132 enables the mobile computing device 130 to receive notification messages 152 from the campaign management server 150, be detected by the PDD 134a-n, and transmit proximity information 162 to the campaign management server 150. The shopper 132 may additionally enable privacy settings to share shopper information with the campaign management server 150. The term "shopper information" may refer to user demographics, social media content, products preferred by the shopper 132, and a purchase history of the shopper 132.

In some implementations, the PDDs 134a-n include Bluetooth beacons that wirelessly transmit low energy Bluetooth (BLE) signals capable of being received by the mobile computing device 130. The proximity information 162 may be indicative of a received signal strength indicator (RSSI) value that the mobile computing device 130 receives from the corresponding PDD 134a-n, whereat higher RSSI values indicate a higher signal strength. The campaign management server 150 may include, or have access to, tables and/or algorithms for calculating the proximity between the mobile computing device 130 and the PDDs 134a-n based upon the RSSI values. The mobile computing device 130 may additionally or alternatively include a software application including the tables and/or algorithms for calculating the proximity. This disclosure is not limited to any specific type of PDD 134 and may include any proximity detection device capable of detecting the proximity of the mobile computing device 130 and using the server 1000 for inferring the location of the shopper 132 based thereon. For example, PDDs 134a-n may include any combination of BLE beacons, near field communication (NFC) devices, and radio frequency identification (RFID) devices.

In the example shown, the campaign management server 150 executing in the cloud environment 120 may use the proximity information 162 received from the mobile computing device 130 executing the shopper GUI 160, and the condition set 142 received from the computing device 110 executing the marketer UI 140, to generate the campaign notification message 152 for a defined campaign type. The notification message 152 may be transmitted to the mobile computing device 130 via the network 125 and displayed in the shopper GUI 160. In some implementations, feedback information 164 related to the received notification message 152 and/or the shopper 132 is transmitted from the mobile computing device 130 to the campaign management server 150 for logging and/or assessment. Examples of the feedback information 164 may include at least one of campaign content included within the transmitted notification message 152, a response by the shopper 132 related to the transmitted notification message 152, a time stamp indicating when the notification message 152 was transmitted, or demographic information related to the shopper 132. In some examples, the response by the shopper 132 can include a shopper input to an interactive graphic displayed by the notification message, such as an answer to an inquiry, a rating/review of a product, and a redeemed coupon. In some implementations, the campaign management sever 1000 provides the feedback information 164 to the computing device 110 via the network 115 based on a feedback request 144 received from the computing device 110.

Figure 2A:
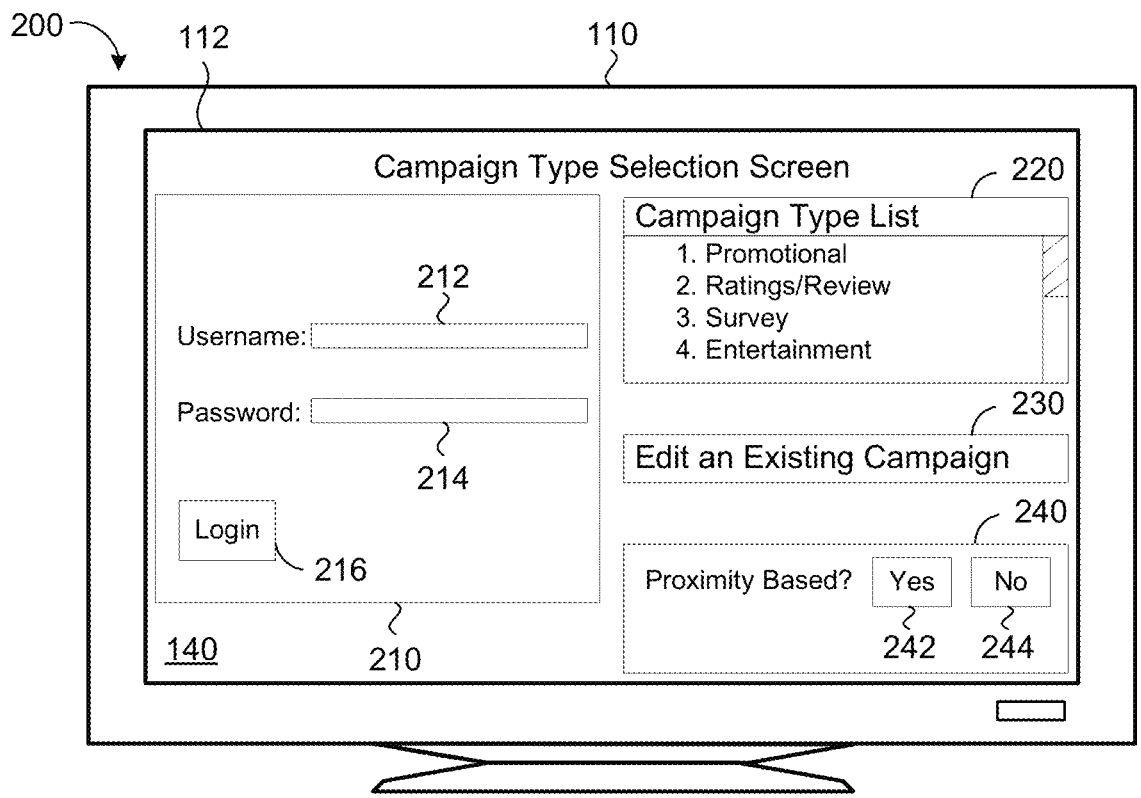
FIGS. 2A and 2B are schematic views of exemplary operations performed by a marketer to define a campaign type (FIG. 2A) and activate a proximity detection device (FIG. 2B) using a marketer computing device that executes a user interface.

In some implementations, the user 102 creates a new marketing campaign related to products/goods or services offered for sale by interfacing through the marketer UI 140 executed by the computing device 110 in the display 112. Creating the new marketing campaign requires the user 102 to define the condition set 142 for the marketing campaign to be published. Referring to FIG. 2A, in some examples, the user 102 enters a Campaign Type Selection Screen 200 displayed in the marketer UI 140 of the display 112 for requesting authorization to create a new marketing campaign and defining the campaign type. The user 102 may be prompted to enter login information 210 for authorization to create the new marketing campaign. In the example shown, a Username 212 and Password 214 may be inputted by the user 102 and the user 102 may execute the request for authorization by selecting a Login button 216. In the example shown, the user 102 may define the campaign type by selecting from a Campaign Type List 220 (hereinafter list 220) displayed in the marketer UI 140. In some examples, the campaign type defined by the user 102 includes any one of a promotional campaign, a survey campaign, a ratings campaign and an entertainment campaign. The "promotional campaign" may refer to one or more advertisements used to promote a product being offered for sale. The "survey campaign" may refer to one or more inquiries requested by a marketer (e.g., user 102) soliciting a response from shoppers 132. The "ratings campaign" may refer to a marketer inquiry requesting shoppers 132 to assess a specific product being offered for sale. The term "entertainment campaign" may refer to interactive games or contests for participation by shoppers. The Screen 200 in some examples allows the user 102 to manually input the defined campaign type.

In some implementations, the user 102 instead edits an Existing Campaign 230 previously created by the user 102 or another user having authorization rights. The Screen 200 may further request the user 102 to select whether or not the marketing campaign is proximity based 240. As used herein, a proximity-based marketing campaign may refer to notification messages 152 delivered to the shopper 132 based upon the shopper's location within the facility. In some implementations, the location of the shopper 132 within the facility may be inferred based upon the proximity information 162 that indicates the proximity of the mobile computing device 130 in relation to a corresponding PDD 134a-n. As used herein, a marketing campaign that is not proximity-based may refer to notification messages 152 that are disseminated to the shopper 132 regardless of where the shopper 132 is located in the facility. In the example shown, the user 102 may select a Yes button 242 to execute the proximity-based marketing campaign or the user 102 may select a No button 244 to execute the marketing campaign that is not proximity-based. The marketer UI 140 advances to a Proximity Detection Device Screen 202 (FIG. 2B) when the user 102 selects the Yes button 242.

Figure 2B:
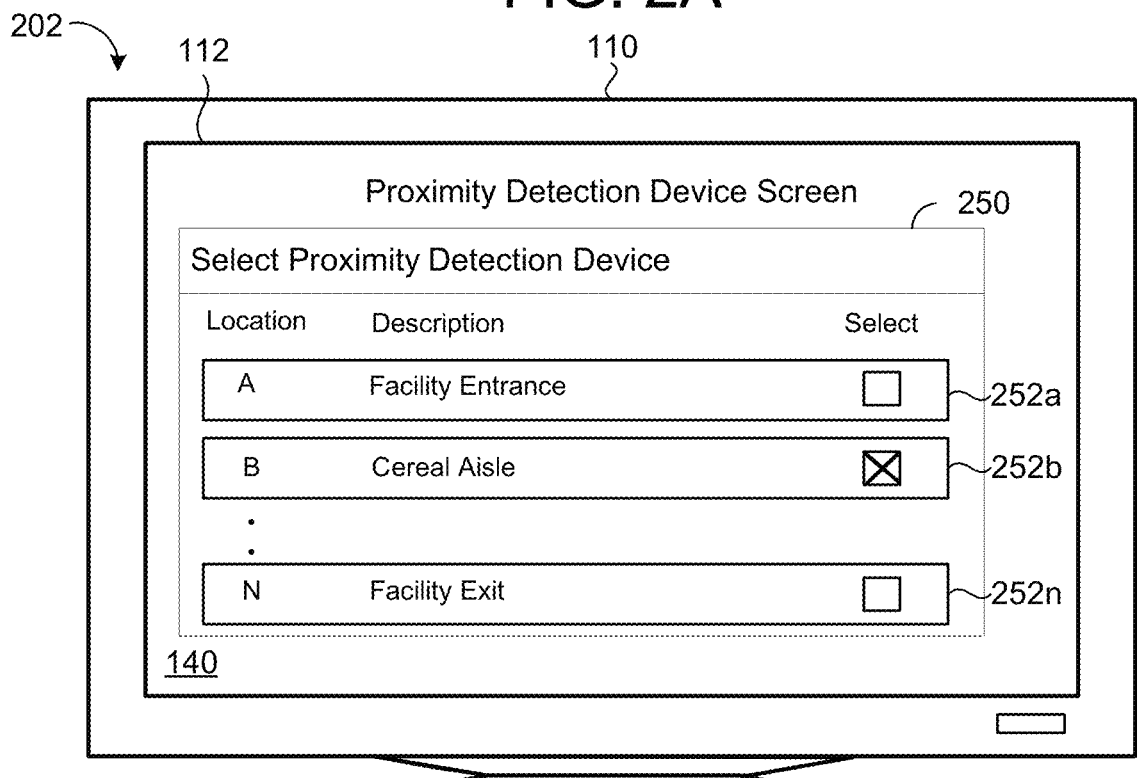

Referring to FIG. 2B, in some examples, the Screen 202 enables the user 102 to select one or more PDDs 134a-n for activation from a list 250 of PDDs 134a-n furnished within one or more facilities. The list 250 may arrange PDDs 134a-n by a location identifier A-N and a corresponding description of the location. For instance, Location A may correspond to the Facility Entrance, Location B may correspond to the Cereal Aisle, and Location N may correspond to the Facility Exit. Each of the PDDs 134a-n within the list 250 may be associated with a corresponding interactive box 252a-n displayed in the marketer UI 140 that permits the user 102 to activate desired PDDs 134a-n. An activated PDD may indicate a location or proximity within the facility desired by the user 102 whereat the shopper 132 receives the notification message 152 for the defined campaign type, e.g., the notification message 152 transmitted from the server 1000 to the mobile computing device 130. A deactivated PDD may indicate a location or proximity within the facility that no notification messages 152 will be delivered to the shopper 132. In the example shown, the user 102 activates the PDD 134, as denoted by the "X" selection, corresponding to Location B at the Cereal Aisle. In some implementations, the condition set 142 received by the campaign management server 150 indicates the campaign type selected by the user 102 at Screen 200 of FIG. 2A and the one or more PDDs 134a-n activated by the user 102 at the Screen 202 of FIG. 2B.

Figure 3A:
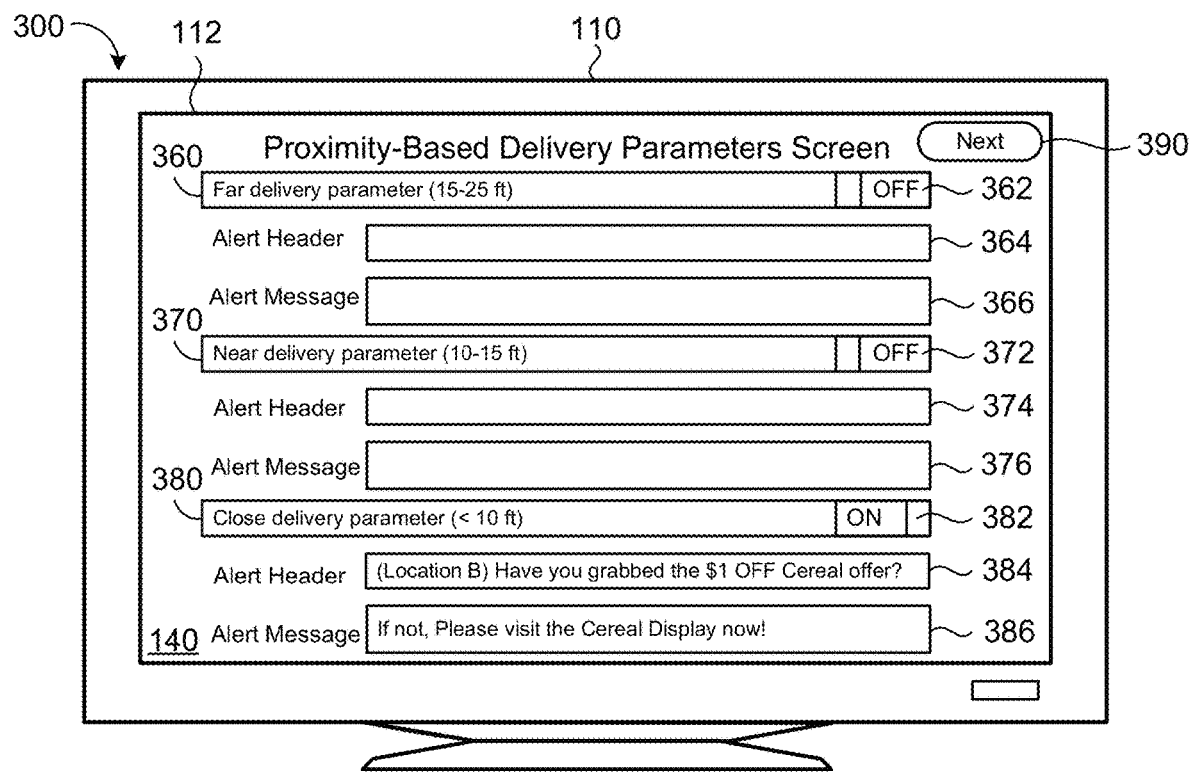
FIGS. 3A-5 are schematic views of exemplary operations performed by a marketer to select one or more proximity-based delivery parameters for a defined campaign type using a marketer computing device that executes a user interface.

In some implementations, the condition set 142, additionally or alternatively, indicates proximity-based delivery parameters 360, 370, 380 input by the user 102. Referring to FIG. 3A, in some examples, the user 102 interfacing with the marketer UI 140 enables and disables proximity-based delivery parameters 360, 370, 380 at a Proximity-Based Delivery Parameters Screen 300 when the user 102 selects the promotional campaign type, i.e., via list 220 at Screen 200 (FIG. 2A). In the example shown, the proximity-based delivery parameters 360, 370, 380 include a Far delivery parameter 360, a Near delivery parameter 370 and a Close delivery parameter 380. Other proximity-based delivery parameters are possible as well. As used herein, each proximity-based delivery parameter 360, 370, 380 indicates campaign content related to the defined campaign type and is associated with a corresponding range of proximities in relation to the activated PDD 134a-n. In the example shown, the Far delivery parameter 360 indicates corresponding campaign content associated with a range of proximities (e.g., 15-25 ft.); the Near delivery parameter 370 indicates corresponding campaign content associated with a range of proximities (10-15 ft.); and the Close delivery parameter 380 indicates corresponding campaign content associated with a range of proximities (e.g., less than 10 ft.). As used herein, the term "campaign content" may include one or more of the following: a message header, a message description, item information, a coupon, a survey inquiry, a rating inquiry, interactive content, and a product image/video. In the example shown, the campaign content displayed in Screen 300 includes a corresponding message header 364, 374, 384 and a corresponding message description 366, 376, 386 for each proximity-based delivery parameter 360, 370, 380, respectively. In some examples, the campaign content for the message headers and descriptions 364, 366, 374, 376, 384, 386 is input by the user 102 via a keyboard, while in other examples, the content is queried from a drop down list of commonly used content. In some implementations, the user 102 enables or disables each proximity-based delivery parameter 360, 370, 380 through selection of a corresponding ON/OFF button 362, 372, 382, respectively. Accordingly, an "ON" (via the ON/OFF button 362, 372, 382) indicates enabled ones of the proximity-based delivery parameters 360, 370, 380 at which the campaign content associated with the range of proximities (e.g., Far, Near or Close) corresponding to the proximity of the mobile computing device 130 is to be retrieved from a non-transitory campaign data store 862 (FIG. 8), such as a database, and used by the server 1000 for generating the notification message 152. In the example shown, the user 102 enables the Close delivery parameter 380, as denoted by the user input indicating selection of "ON" via button 382, for the activated PDD 134b corresponding to Location B (i.e., the Cereal Aisle) shown in Screen 202 of FIG. 2B. Thus, the campaign management server 150 retrieves the campaign content from the campaign data store 862 (FIG. 8), including the message header 382 and the message description 384, and utilizes the retrieved campaign content for generating and transmitting the notification message 152 to the mobile computing device 130 for display in the shopper GUI 160 for the shopper 132 to view. In the example shown, since the user 102 disables the Far and Near delivery parameters 360, 370, respectively (e.g., buttons 362 and 372 indicate "OFF"), the campaign management server 150 may not retrieve any campaign content 364, 366, 374, 374 when the mobile computing device 130 is within the range of proximities corresponding to the Far and Near delivery parameters 360, 370, respectively.

Figure 3B:
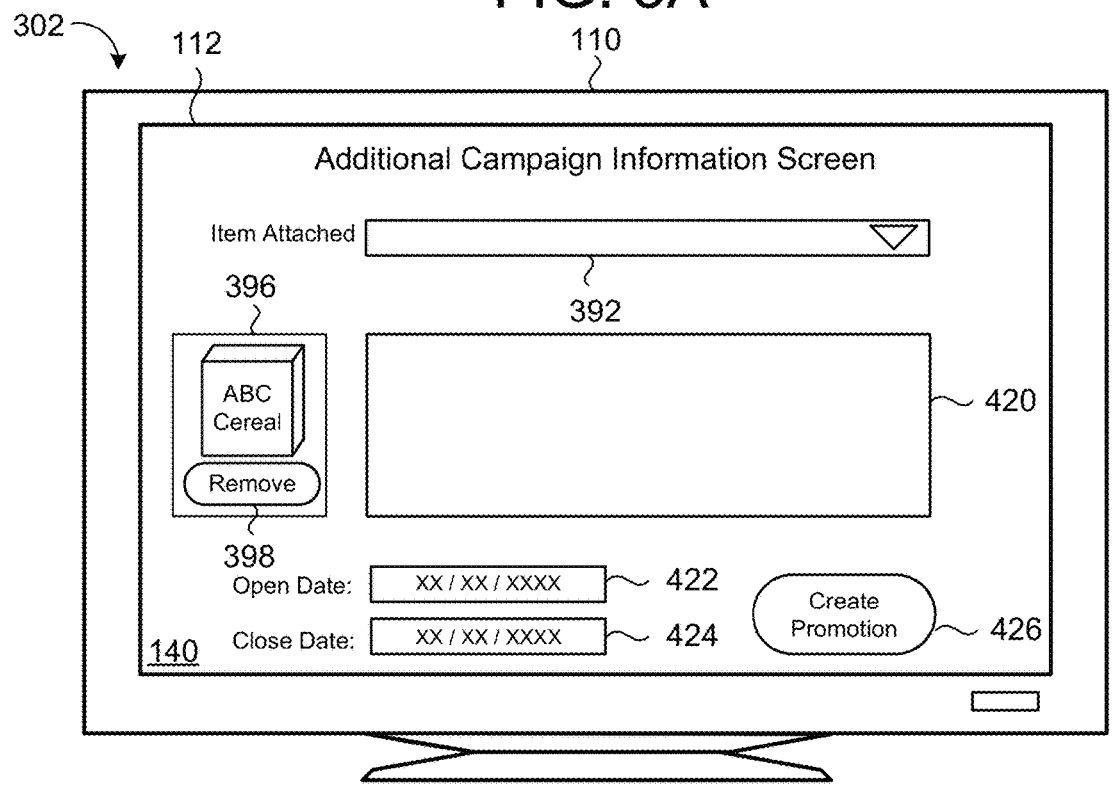

Referring to FIG. 3B, in some examples, the user 102 advances from Screen 300 of FIG. 3A via selection of a Next button 390 to an Additional Campaign Information Screen 302. Interfacing with the marketer UI 140, the user 102 may input additional campaign content for the promotional campaign at Screen 302. The user 102 may attach an item identifying the product being offered for sale via a manual input to block 392 or accessing a pull-down menu at block 392. The user 102 may attach the item from one or more of the following in the pull-down menu 392: a website; social media; or a video overlay. In the example shown, the user 102 may access the pull-down menu at block 392 to attach the item information from a list including a uniform resource locator (URL) website address or customer ratings/reviews/feedback. A product description 420 may be included to indicate product availability, product dimensions, similar products, a barcode for the product, and an attached coupon for the product that the shopper 132 may redeem. A product image 396 may further be displayed when the item is attached, wherein the user 102 is permitted to remove the image 396 via selection of a Remove button 398. In some implementations, the condition set 142 further includes a delivery schedule of the campaign information for the defined campaign type indicating a time period at which the campaign management server 150 may generate and transmit the notification message 152 to the shopper mobile computing device 130. In the example shown, the user 102 may input the time period for the defined campaign type by inputting an open date 422 and a close date 424. The user 102 may manually input in some examples; while in other example, the user 102 may input the open and close dates 422, 424, respectively, from an interactive calendar graphic. The user 102 may execute completion of the promotional campaign by selecting the Create Promotion button 426. Thereafter, the condition set 142 inputted by the user 102 interfacing with the marketer UI 140 at screens 200-302 of FIGS. 2A-3B, may be transmitted to the campaign management server 150. The campaign management server 150 may store the conditional set 142 in the campaign data store 862 (FIG. 8) for eventual retrieval to generate the notification message 152 in response to the proximity information 162.

Figure 4A:
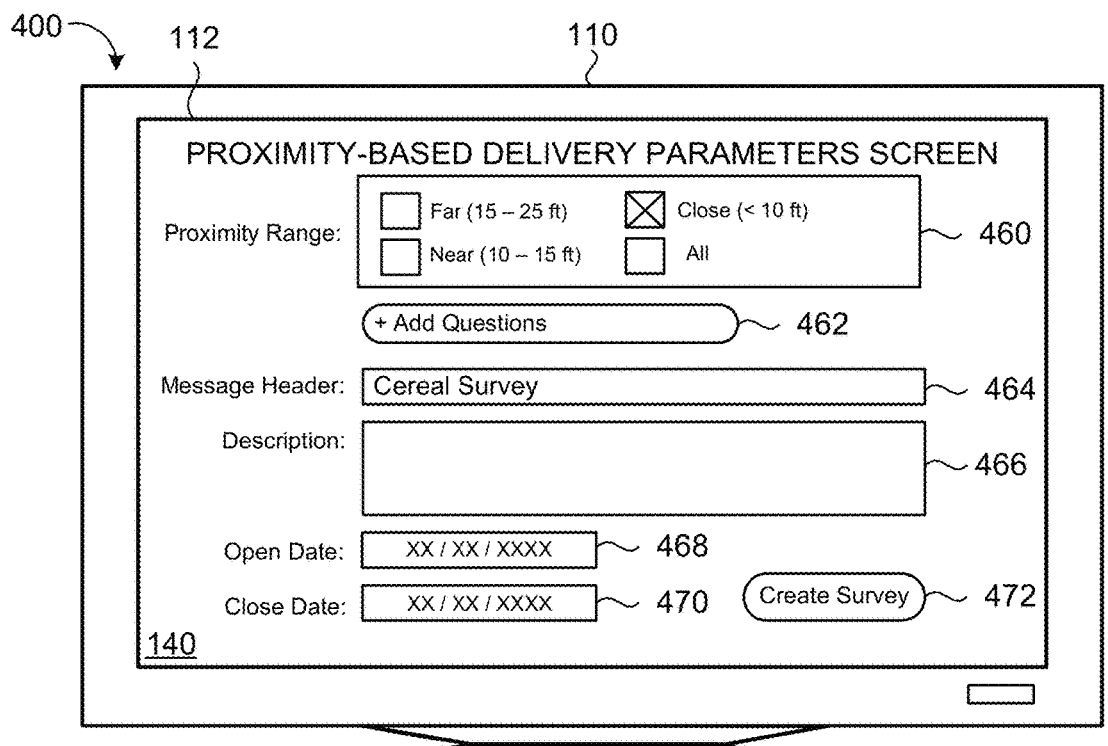

Referring to FIG. 4A, in some examples, the user 102 interfacing with the marketer UI 140 enables and disables proximity-based delivery parameters 360, 370, 380 at a Proximity-Based Delivery Parameters Screen 400 when the user 102 selects the survey campaign type, i.e., list 220 at Screen 200 (FIG. 2A). The user 102 may request inquiries that solicit a response from the shopper 132 for the survey campaign. In the example shown, the proximity-based delivery parameters 360, 370, 380 are selectively enabled by the user 102 within a proximity range block 460. In some examples, the proximity-based delivery parameters 360, 370, 380 within the proximity range block 460 correspond to the activated PDD 134, e.g., the activated PDD 134b corresponding to Location B (i.e., the Cereal Aisle) shown in Screen 202 of FIG. 2B. In some implementations, the marketer UI 140 utilizes additional Screens 400 for each additional PDD 134a-n that the user 102 activates. In some examples, the proximity-based delivery parameters within box 460 include the same Far, Near and Close delivery parameters 360, 370, 380 described with reference to Screen 300 of FIG. 3A. In some examples, the proximity range block 460 allows the user 102 to select "All" the proximity delivery parameters. An "X" denotes an enabled proximity delivery parameter. In the example shown, the user 102 selectively enables the Close delivery parameter.

The user 102 may input campaign content displayed on Screen 400 including survey inquiries via Add Questions button 462, a message header within block 464, a message description within block 466, and a delivery schedule for the condition set 142 within open and close date blocks 468, 470, respectively. The user 102 may input the message header, message description and the delivery schedule within blocks 464-470 in a manner similar to the user inputs shown in Screens 300 and 302 of FIGS. 3A and 3B, respectively. The user 102 advances to a Survey Information Screen 402 (FIG. 4B) from Screen 400 when the user 102 selects the survey inquires via an input to the Add Questions button 462.

Figure 4B:
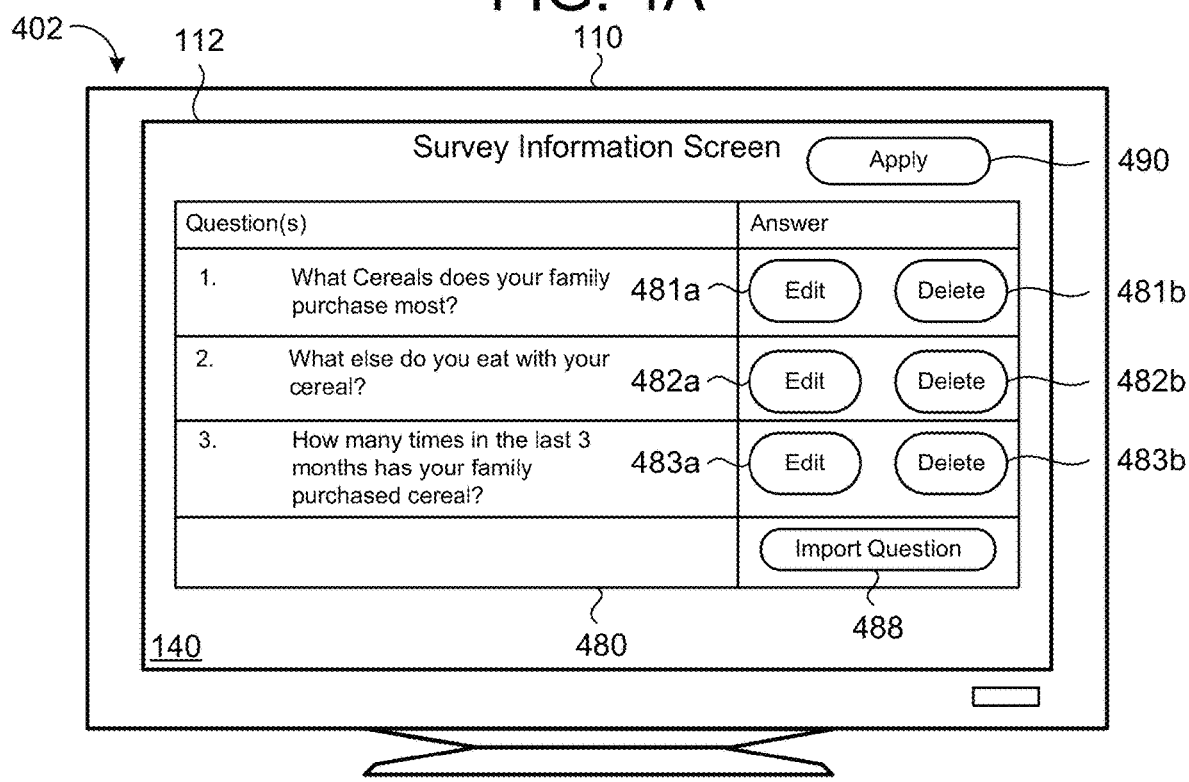

Referring to FIG. 4B, in some examples, interfacing with the marketer UI 140, the user inputs survey information at Screen 402. The survey information includes inquiries that the user 102 (e.g., marketer) requests responses from the shopper 132. In the example shown, the Screen 402 includes an inquiry box 480 that arranges inquiries (e.g., questions) that the user 102 desires for the survey campaign. The user 102 may manually input each inquiry or question. In some examples, the user 102 edits each question via a user input to a corresponding Edit button 481a, 482a, 483a. In some examples, the user 102 additionally or alternatively deletes each question via a user input to a corresponding Delete button 481b, 482b, 483b. The user 102 may import one or more additional inquires stored in a database furnished at the computing device 110 or the one or more computers 122 of the cloud computing environment 120 managed by the campaign management server 150. For example, the user 102 may import the one or more additional inquiries via a user input to an "Import Question" button 488. Each question of the survey inquiry may be associated with a set of generic answers for the shopper's response. In the example shown, the user 102 may apply the input inquiries via selection of the Apply button 490 whereat the Screen 402 reverts back to Screen 400 (FIG. 4A). Referring back to Screen 400 of FIG. 4A, in some implementations, the user 102 executes completion of the survey campaign by selecting a Create Survey button 472. The user 102 may input interactive games and contests for shoppers 132 to participate using a Screen similar to Screens 400 and 402, when the user 102 selects the entertainment campaign type, i.e., list 220 at Screen 200 (FIG. 2A).

Figure 5:
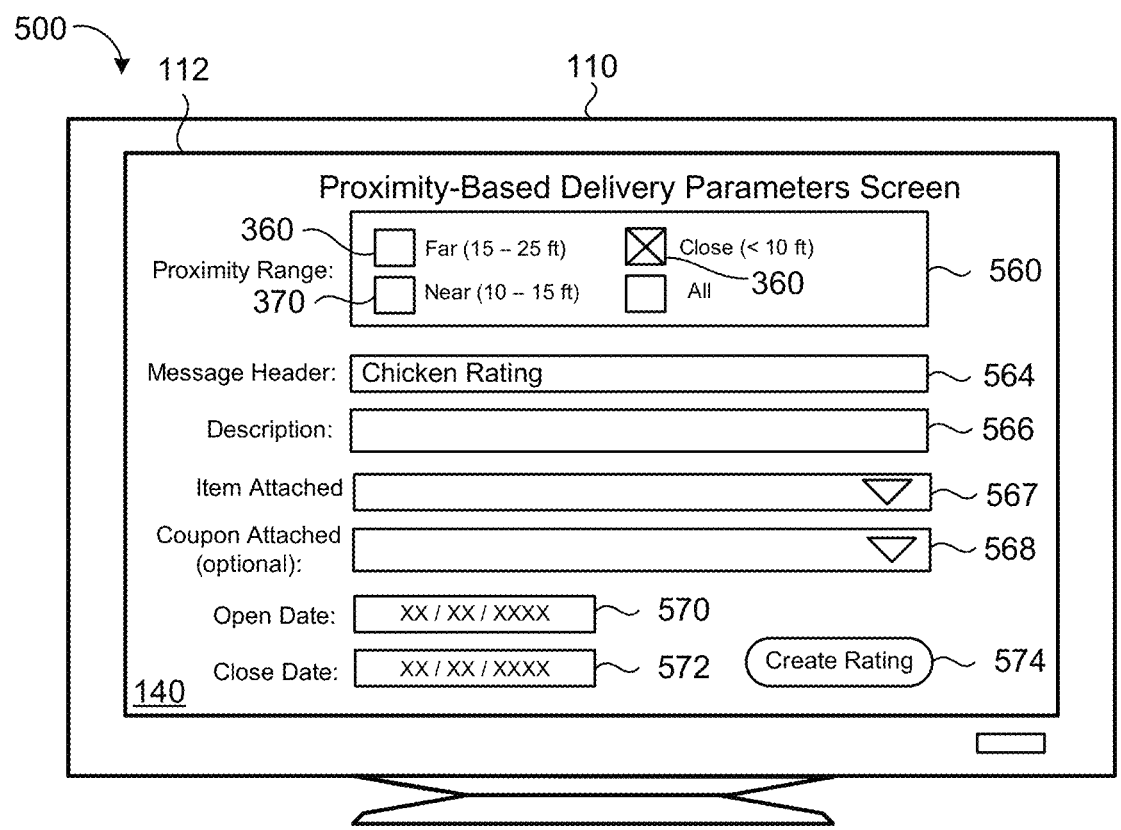

Referring to FIG. 5, in some examples, the user 102 interfacing with the marketer UI 140 enables and disables proximity-based delivery parameters 360, 370, 380 at a Proximity-Based Delivery Parameters Screen 500 when the user 102 selects the ratings campaign type, i.e., list 220 at Screen 200 (FIG. 2A). In the example shown, the proximity-based delivery parameters 360, 370, 380 are selectively enabled by the user 102 within a proximity range block 560. In some examples, the proximity-based delivery parameters 360, 370, 380 within the proximity range block 560 correspond to the activated PDD 134, e.g., the activated PDD 134b corresponding to Location B (i.e., the Cereal Aisle) shown in Screen 202 of FIG. 2B. In some implementations, additional Screens 500 are utilized for each additional PDD 134a-n that the user 102 activates. The proximity-based delivery parameters 360, 370, 380 within box 560 may include the same Far, Near and Close delivery parameters 360, 370, 380 described with reference to Screen 300 of FIG. 3A. In some examples, the proximity range block 560 allows the user 102 to select "All" the proximity-based delivery parameters. An "X" denotes an enabled proximity-based delivery parameter. In the example shown, the user 102 selectively enables the close proximity delivery parameter 360. The user 102 may input campaign content displayed on Screen 500 including a message header within block 564, a message description within block 566, an attached item via the Item Attached pull-down menu 567, an attached coupon redeemable by the shopper via the Coupon Attached pull-down menu 568 and a delivery schedule for the condition set 142 within open and close date blocks 570, 572, respectively. The user 102 may input the message header, message description, the attached item (and corresponding image), the attached coupon and the delivery schedule within blocks and pull-down menus 564-572 in a manner similar to the user inputs shown in Screens 300 and 302 of FIGS. 3A and 3B, respectively. In the example shown, the user 102 may execute completion of the ratings campaign by selecting a Create Rating button 574. The shopper 132 may additionally be permitted or requested to review the specific product.

Referring to FIG. 6, in some implementations, the shopper computing device 130 displays a message notification 152 to a shopper 132 within a shopping environment 600 of a facility based upon a proximity of the shopper mobile computing device 130 in relation to a PDD 134. Some implementations show corresponding campaign content for each notification message 152 transmitted to the mobile computing device 130 of a shopper 132 traveling through the facility based upon the proximity-based delivery parameters 360, 370, 380 of the condition set 142 for the activated PDD 134 and the proximity of the mobile computing device 130 in relation thereto. The proximity information 162 indicating the proximity of the shopper mobile computing device 130 may be received by the campaign management server 150 from the mobile computing device 130 to infer the facility location of the shopper 132.

In some implementations, a shopper 132a is located at an entrance of the facility whereat the proximity of the shopper mobile computing device 130a in relation to the PDD 134 is equal to a distance d3. In response to the proximity information 162 indicating the distance d3 received from the mobile computing device 130a and the condition set 142 received from the computing device 110 inputted by the user 102 interfacing with the marketer UI 140, the campaign management server 150 may generate and transmit a notification message 152a to the shopper mobile computing device 130a. In the example shown, the marketer UI 140 displays the notification message 152a in the shopper GUI 160a; the notification message 152a is indicative of a Far Notification including campaign content that corresponds to the distance d3 of the mobile computing device 130a. The campaign content may be defined for a corresponding proximity-based delivery parameter indicating a range of proximities that distance d3 falls within, e.g., the Far delivery parameter 362, 364, 366 shown in Screen 300 of FIG. 3A.

In some implementations, the shopper 132b is located at a condiment display shelf 610, within the facility, that is next to cereal display shelves 620 of a cereal aisle. In the example shown, the proximity of the shopper mobile computing device 130b in relation to the PDD 134 is equal to a distance d2. In response to the proximity information 162 indicating the distance d2 received from the mobile computing device 130b and the condition set 142 received from the computing device 110 input by the user 102 interfacing with the marketer UI 140, the campaign management server 150 may generate and transmit a notification message 152b to the shopper mobile computing device 130b. The marketer UI 140 displays the notification message 152b in the shopper GUI 160b; the notification message 152b is indicative of a Near Notification corresponding to the distance d2 of the mobile computing device 130b. In some examples, the campaign content is defined for a corresponding proximity-based delivery parameter 370 indicating a range of proximities that distance d2 falls within, e.g., the Near delivery parameter 372, 374, 376 shown in Screen 300 of FIG. 3A. In the example shown, the notification message 152b displayed in the shopper GUI 160b at distance d2 is distinct from the notification message 152a displayed in the shopper GUI 160a at distance d3.

In some implementations, the shopper 132c is located at the cereal display shelf 620 in the cereal aisle. The proximity of the shopper mobile computing device 130c in relation to the PDD 134 is equal to a distance d1. In response to the proximity information 162 indicating the distance d1 received from the mobile computing device 130c and the condition set 142 received from the computing device 110 input by the user 102 interfacing with the marketer UI 140, the campaign management server 150 may generate and transmit a notification message 152c to the shopper mobile computing device 130c. The marketer UI 140 displays the notification message 152c in the shopper GUI 160c; the notification message 152c is indicative of a Close Notification corresponding to the distance d1 of the mobile computing device 130c. In some examples, the campaign content is defined for a corresponding proximity-based delivery parameter 380 indicating a range of proximities that distance d1 falls within, e.g., the Close delivery parameter 382, 384, 386 shown in Screen 300 of FIG. 3A. In the example shown, the notification message 152c displayed in the shopper GUI 160c at distance d1 is distinct from each of the notification messages 152a,152b displayed in the shopper GUIs 160a, 160b at distances d3 and d2, respectively.

Referring to FIGS. 7A-7C, in some implementations, the shopper GUI 160 executed by the mobile computing device 130 displays the notification message 152 transmitted from the campaign management server 150. In some implementations, the mobile computing device 130 runs a campaign application managed by the campaign management server 150 that enables the shopper 132 to interact with the received notification message 152. In some examples, the campaign application enables the shopper GUI 160 to display a menu bar 742 including one or more interactive graphics, such as a home icon 742a to access a campaign home screen, a list icon 742b to access an offer screen that displays offers and/or coupons saved and/or redeemed by the shopper 132, a star icon 742c to access a favorites screen that displays notification messages saved by the shopper 132, and a settings icon 742d to access a settings screen for adjusting shopper preferred settings for the campaign application.

Referring to FIG. 7A, in some examples, the shopper GUI 160 displays the notification message 700A for the promotional campaign defined by the user 102 at Screens 300 and 302 of FIGS. 3A and 3B, respectively. In the example shown, the notification message 152 displayed in the GUI 160 includes a message header 784 (corresponding to message header 384 at Screen 300 of FIG. 3A), a message description 786 (corresponding to message description 386 at Screen 300 of FIG. 3A), a product description 720 (corresponding to the product description 420 at Screen 302 of FIG. 3B), and a product image 796 (corresponding to the product image 396 at Screen 302 of FIG. 3B).

Referring to FIG. 7B, in some examples, the shopper GUI 160 displays the notification message 700B for the survey campaign defined by the user 102 at Screens 400 and 402 of FIGS. 4A and 4B, respectively. In the example shown, the notification message 152 displayed in the GUI 160 includes a message header 764 (corresponding to the message header 464 at screen 400 of FIG. 4A), a list of inquiries and answer selections 780 (corresponding to the inquiry box 480 at Screen 402 of FIG. 4B) and an interactive Redeem Coupon button 722 enabling the shopper 132 to redeem an attached coupon related to a product (e.g., cereal). The Redeem Coupon button 722 may only be displayed in the GUI 160 after the shopper 132 has answered all the inquiries requested by the user 102.

Referring to FIG. 7C, in some examples, the shopper GUI 160 displays the notification message 700C for the rating campaign defined by the user 102 at Screen 500 of FIG. 5). The notification message displayed in the GUI 160 includes a message header 774 (corresponding to the message header 564 at Screen 500 of FIG. 5), a message description 766 (corresponding to the message description 566 at Screen 500 of FIG. 5), an interactive rating graphic 778, and an interactive Redeem Coupon button 724 (corresponding to the coupon attached pull-down menu 568 at Screen 500 of FIG. 5) enabling the shopper 132 to redeem an attached coupon related to a product (e.g., chicken). In some examples, the Redeem Coupon button 724 is only displayed in the GUI 160 after the shopper 132 has rated the product via inputs to the interactive rating graphic. In some implementations, the interactive rating graphic 778 is generated within the notification message 152 based upon the user 102 defining the rating campaign from the list 220 at Screen 200 FIG. 2A and the attached item from the item attached pull-down menu 567 at screen 500 of FIG. 5. In the example shown, the interactive rating graphic 778 includes a plurality of interactive sub-graphics 778a (e.g., stars) that may receive an input from the shopper 132 to indicate the rating of the product.

Figure 8:
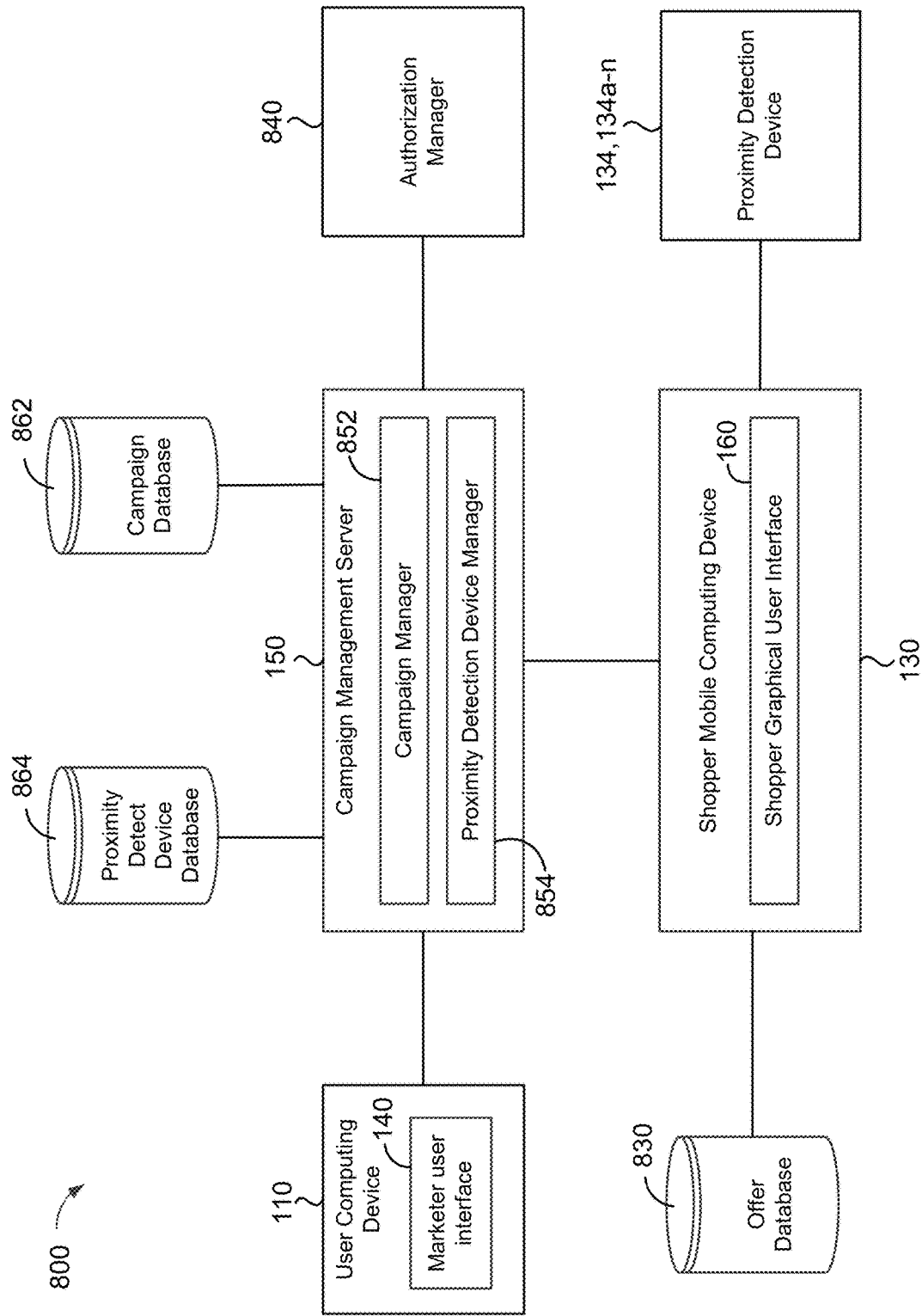
FIG. 8 is a schematic view of an exemplary campaign management system.

FIG. 8 is a block diagram of a campaign management system 800 that includes the campaign management server 150, the shopper mobile computing device 130, the user computing device 110, the PDDs 134a-n, an authorization manager 840, a non-transitory offer data store 830, a non-transitory PDD data store 864, and a non-transitory campaign data store 862.

The shopper mobile computing device 130 executes the Shopper GUI 160 within the display 136. The shopper mobile computing device 130 includes at least one processing device for executing communications with the at least one PDD 134a-n and the campaign management server 150 executed in the cloud computing environment 120. The user computing device 110 executes the marketer UI 140 within the display 112. The user computing device 110 includes at least one processing device for executing communications with the campaign management server 150. In some examples, the user computing device 110 transmits the condition set 142 of a marketing campaign for generating the notification message 152. Components of the mobile computing device 130 and the user computing device 110 are described in further detail with reference to the processing device 1010 shown in FIG. 10.

The campaign management server 150 includes at least one processing device for executing a campaign manager 852 and a PDD manager 854. In some implementations, the campaign manager 852 receives the condition set 142 transmitted from the user computing device 110 via the network 115. The campaign manager 852 may also communicate with the campaign data store 862 to store the received condition set 142. The campaign database 862 includes persistent (non-transitory) storage for storing one or more received condition sets 142. In some implementations, the campaign manager 852 retrieves campaign content from one or more proximity-based delivery parameters stored in the campaign data store 862 using the proximity information 162 transmitted from the mobile computing device 130, and thereafter, generate the notification message 152 based thereon. Components of the campaign management server 150 are described in further detail with reference to the processing device 1010 shown in FIG. 10.

In some implementations, the PDD manager 854 receives a configuration of all PDDs 134a-n furnished by one or more facilities that may indicate locations for each of the PDDs 134a-n, battery level and activation status. The PDD manager 854 may also communicate with the PDD data store 864 to store the PDD configuration. The PDD data store 864 includes persistent (non-transitory) storage for the PDD configuration. In some implementations, the PDD manager 854 receives the proximity information 162 and a corresponding PDD identifier from the shopper mobile computing device 130 and interfaces with the campaign manager 852 to retrieve the PDD configuration and the condition set 142 from the PDD and campaign data stores 862, 864, respectively.

The offer data store 830 communicates with the mobile computing device 130. In some implementations, the offer data store 830 is external to the mobile computing device 130. In other embodiments, the offer data store 830 is within one or more storage devices of the mobile computing device 130. In some examples, the offer data store 830 is configured to store campaign content of the notification message 152 received at the mobile computing device 130. For instance the campaign content stored by the offer data store 830 may include offers and/or coupons redeemed by the shopper 132. The offer data store 830 includes persistent (non-transitory) storage for offers and/or coupons received by the mobile computing device 130.

In some implementations, the authorization manager 840 authorizes access by the user 102 (e.g., marketer) through verification that the user 102 has authorization rights to input the condition set 142 to the user computing device 110 and transmit the condition set 142 to the campaign management server 150. For instance, the marketer UI 140 may be accessed by the user computing device 110 to send a user identifier corresponding to the user 102 to the campaign manager 852, wherein the campaign manager 852 uses the user identifier to verify if the user 102 has rights to input and transmit the condition set 142 to the campaign manager 852. In some implementations, the authorization manager 840 authorizes access by the PDD 134a-n that detects the mobile computing device 130. For instance, the mobile computing device 130 may send a PDD identifier corresponding to the PDD 134a-n that detected the mobile computing device 130 to the PDD manager 854, where the PDD manager 854 uses the PDD identifier to verify if the corresponding PDD 134a-n has a PDD configuration desired for transmitting notification messages 152 to mobile computing devices 130 detected by the corresponding PDD 134a-n. In some implementations, the authorization manager 840 authorizes access by the shopper 132 through verification that the shopper 132 has authorization rights to communicate with the campaign manager 852 and the PDD manager 854. For instance, the GUI 160 may be accessed by the mobile computing device 130 to send a shopper identifier corresponding to the shopper 132 to the campaign manager 852, wherein the campaign manager 852 uses the shopper identifier to verify if the shopper 132 has rights to receive notification messages 152 and transmit feedback information 164 to the campaign manager 854.

Figure 9:
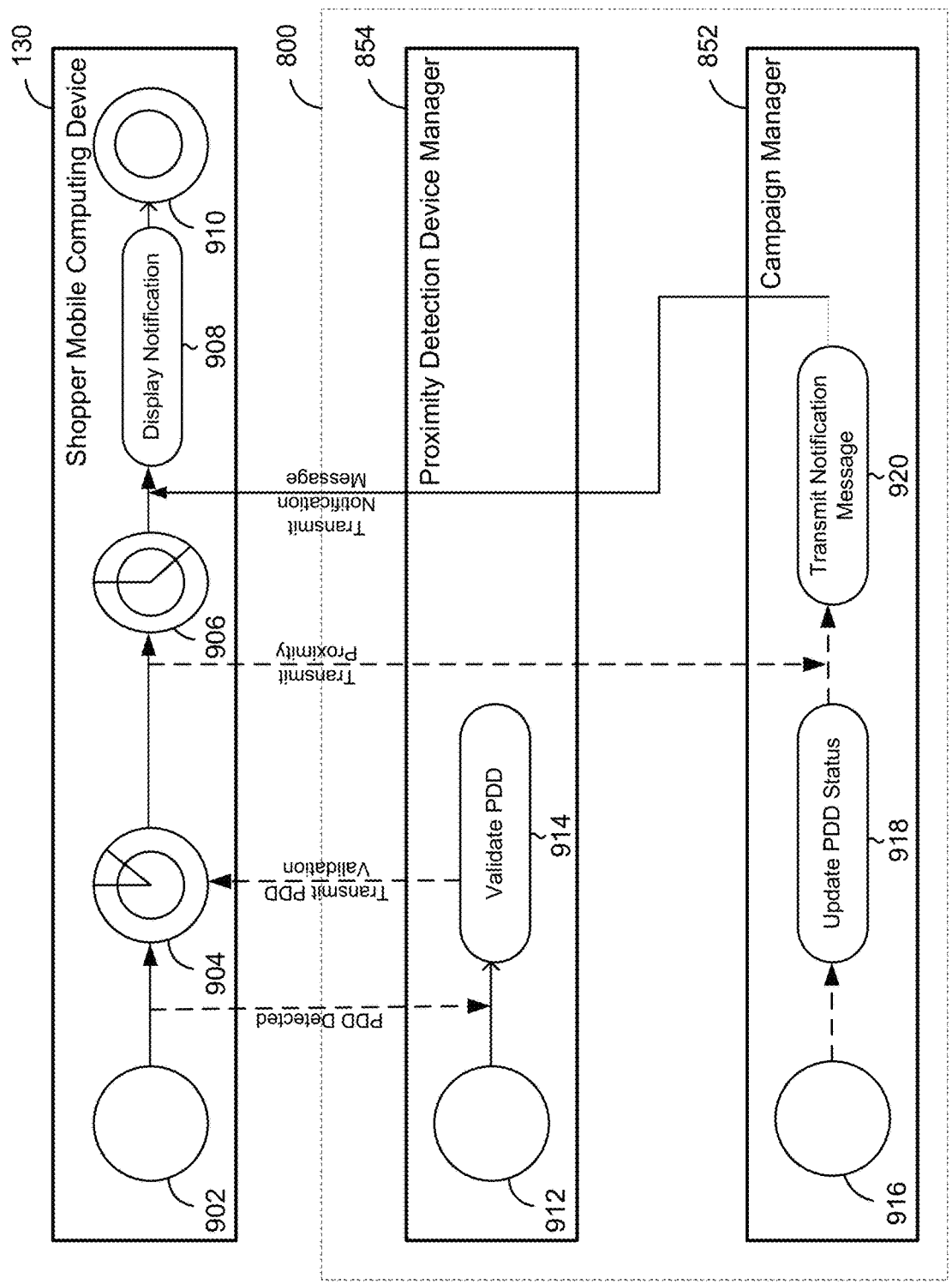
FIG. 9 is a schematic view of exemplary operations performed by a shopper mobile computing device and a campaign management server.

FIG. 9 is a schematic view of operations performed by the shopper mobile computing device 130 and the campaign management server 150 when the mobile computing device 130 is detected by one of the activated PDDs 134. The campaign management server 150 includes the campaign manager 852 and the PDD manager 854 and the example operations are performed by time increasing from the left to the right. At operation 902, the shopper mobile computing device 130 is detected by the activated PDD 134 and transmits a 'PDD Detected' signal indicating the mobile computing device 130 has been detected by the PDD 134 to the PDD manager 854 between operations 912 and 914. Operations 912 and 916 of the PDD and campaign managers 854, 852, respectively, indicate that the corresponding managers 854 and 852 are enabled to communicate with the mobile computing device 130. The 'PDD Detected' signal includes the PDD identifier corresponding to the PDD 134 and the activation status of the PDD 134. At operation 914, the PDD manager 854 validates the PDD 134 using the PDD identifier and transmits a PDD validation signal to the shopper mobile computing device 130 whereat a timer is started at operation 904. Simultaneously, at operation 918, the campaign manager 852 updates the activation status of the corresponding PDD 134.

After a predetermined period of time has elapsed at operation 906, the mobile computing device 130 transmits a signal ('Transmit Proximity') indicating the proximity information 162 to the campaign manager 852. Here, the campaign manager 852 may retrieve a condition set 142 from the campaign data store 862 based on the proximity information 162 transmitted from the mobile computing device 130. At operation 920, the campaign manager 852 may generate a notification message 152 related to the condition set 142 and transmit the notification message 152 to the mobile computing device 130 via a 'Transmit Notification Message' signal. Thereafter, the mobile computing device 130 may display the notification message 152 in the GUI 160 of the mobile computing device 130 at operation 908, whereat the shopper 132 may interact with interactive graphics of the displayed notification message 152 at operation 910.

Figure 10:
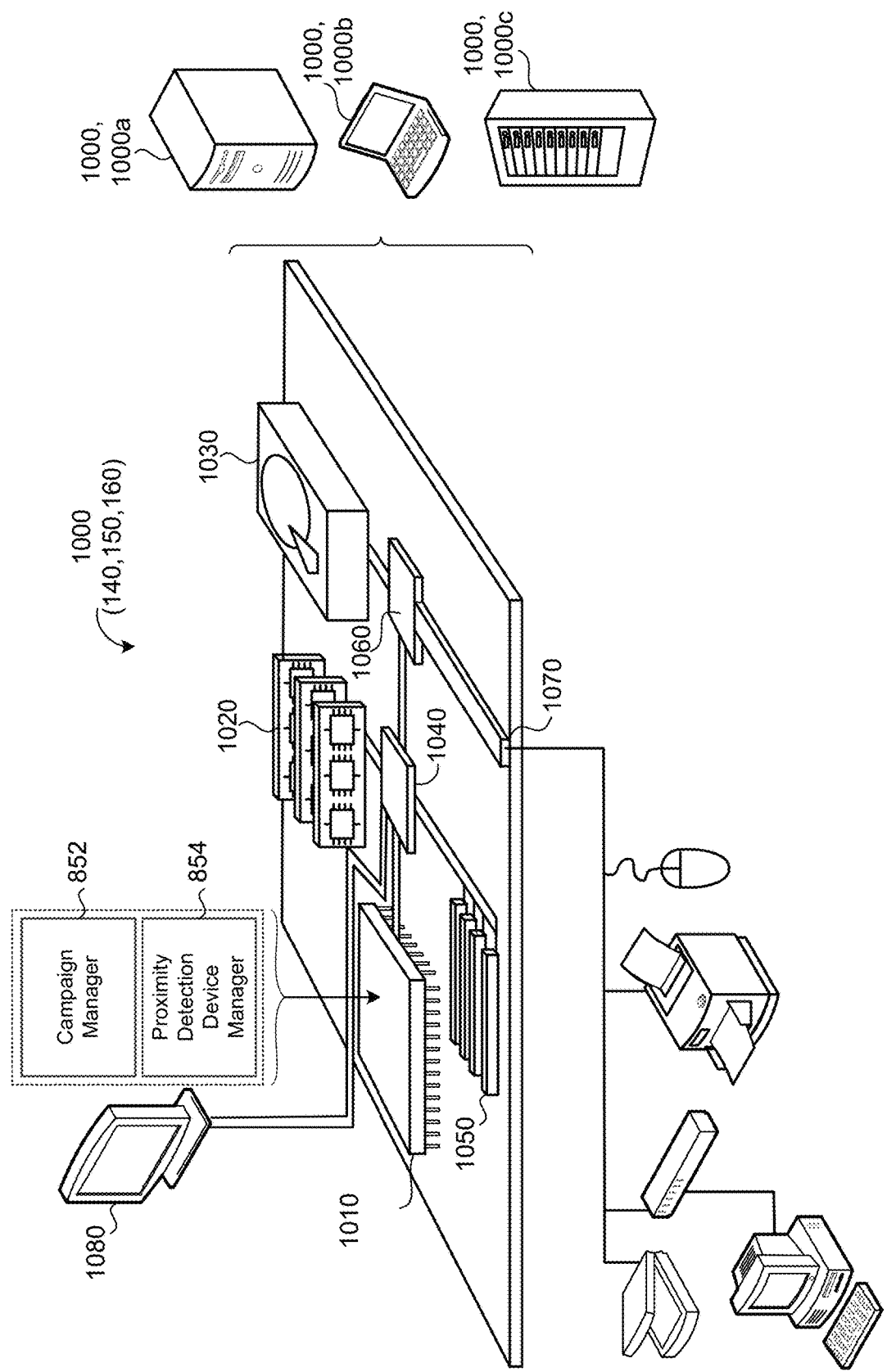
FIG. 10 is a schematic view of an exemplary campaign management server of FIG. 8.

FIG. 10 is schematic view of an example computing device 1000 that may be used to implement the systems and methods described in this document, such as the computing device 110, the campaign management server 150 and the shopper mobile computing device 130. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 1010, memory 1020, a storage device 1030, a high-speed interface/controller 1040 connecting to the memory 1020 and high-speed expansion ports 1050, and a low speed interface/controller 1060 connecting to a low speed bus 1070 and a storage device 1030. Each of the components 1010, 1020, 1030, 1040, 1050, and 1060, are interconnected using various busses, and may be mounted on a common motherboard or in other manners as appropriate. The processor 1010 can process instructions for execution within the computing device 1000, including instructions stored in the memory 1020 or on the storage device 1030 to display graphical information for a graphical user interface (GUI) on an external input/output device, such as a display 1080 coupled to a high speed interface 1040. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1020 stores information non-transitorily within the computing device 1000. The memory 1020 may be a computer-readable medium, a volatile memory unit(s), or non-volatile memory unit(s). The non-transitory memory 1020 may be physical devices used to store programs (e.g., sequences of instructions) or data (e.g., program state information) on a temporary or permanent basis for use by the computing device 1000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1030 is capable of providing mass storage for the computing device 1000. In some implementations, the storage device 1030 is a computer-readable medium. In various different implementations, the storage device 1030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1020, the storage device 1030, or memory on the processor 1010.

The high speed controller 1040 manages bandwidth-intensive operations for the computing device 1000, while the low speed controller 1060 manages lower bandwidth-intensive operations. Such allocation of duties is exemplary only. In some implementations, the high-speed controller 1040 is coupled to the memory 1020, the display 1080 (e.g., through a graphics processor or accelerator), and to the high-speed expansion ports 1050, which may accept various expansion cards (not shown). In some implementations, the low-speed controller 1060 is coupled to the storage device 1030 and low-speed expansion port 1070. The low-speed expansion port 1070, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 1000 may be implemented in a number of different forms, as shown in FIG. 10. For example, it may be implemented as a standard server 1000*a* or multiple times in a group of such servers 1000*a*, as a laptop computer 1000*b*, or as part of a rack server system 1000*c*.

In some implementations, the server 1000 further includes the offer data store 830, the campaign data store 862 and the PDD data store 864 (e.g., in the memory 1020). The processing device 1010 executes the campaign manager 852 and the PDD manager 854. For example, the campaign manager 852 (executing on the processing device 1010) may receive the condition set 142 from the computing device 110 corresponding to the user/marketer 102, store the condition set 142 at the campaign data store 862 and generate the notification message 152. In another example, the PDD manager 854 may receive the proximity information 162 from the shopper mobile computing device 130 corresponding to the shopper 132, and store the proximity information 162 and activation status of a PDD 134 in the PDD data store 864. The PDD manager 854 may further interface with the campaign manager 852 to retrieve the proximity information 162 from the PDD data store 864 for generating the notification message 152.

The storage device 1012 of the campaign management server 150 may provide mass storage for the processing device 1010. In some implementations, the storage device 1012 is a computer-readable medium. In various different implementations, the storage device 1012 may be a floppy disk device, a hard disk device, an optical disk device, or a tape device, a flash memory or other similar solid state memory device, or an array of devices, including devices in a storage area network or other configurations.

The communication device 1010 may facilitate communication between the campaign management server 150 and each user 102 via the marketer UI 140, the mobile computing device 130 and the data stores 830, 862, 864. The communication device 1010 may further communicate with the authorization manager 840.

Figure 11:
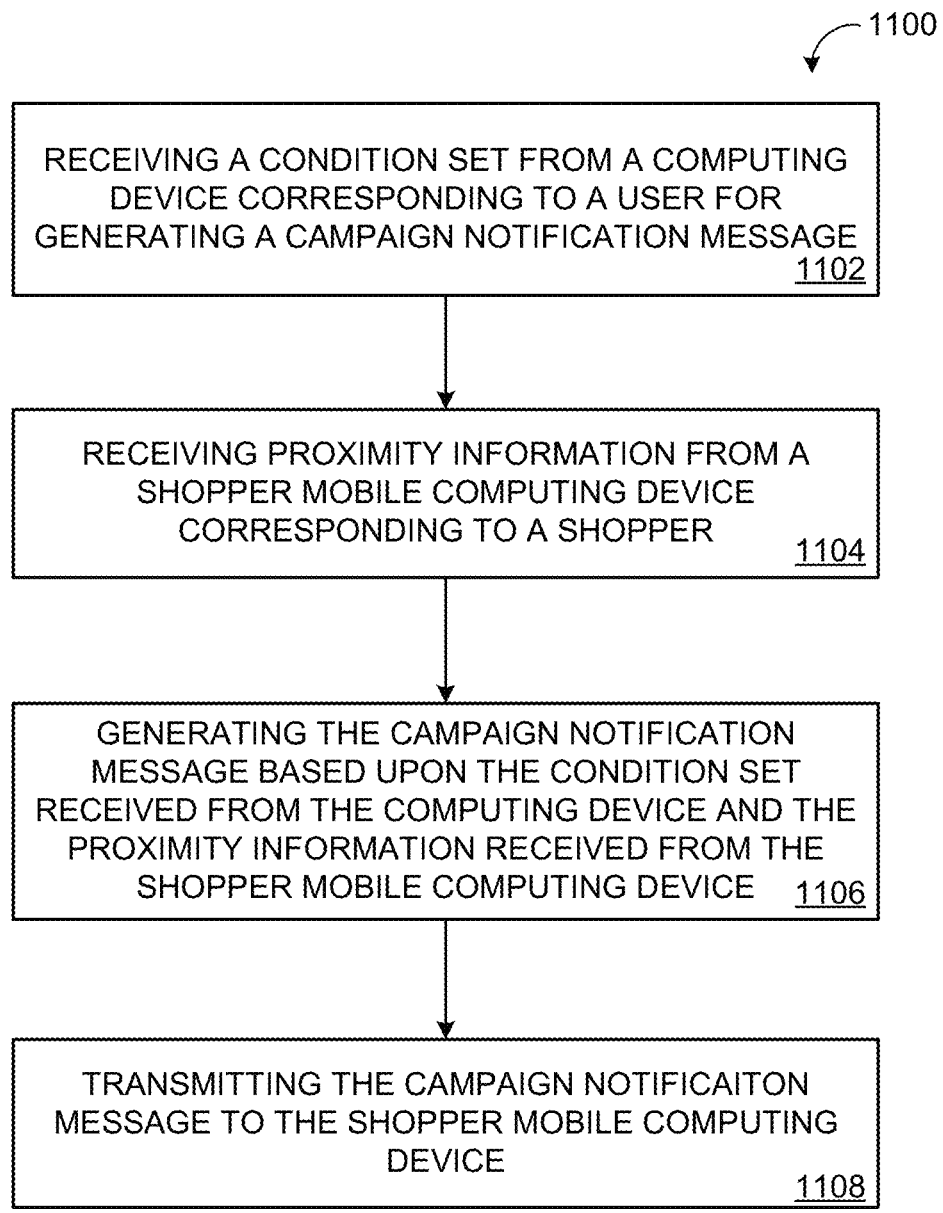
FIG. 11 is a flowchart of an exemplary arrangement of operations for transmitting a campaign notification message to a shopper mobile computing device within a facility furnished by a retailer.

Referring to FIG. 11, in some implementation, a the processing device 1010 executes a method 1100 of the campaign management server 150 of FIG. 10 for transmitting a notification message to the shopper mobile computing device 130 within a facility furnished by a retailer. At operation 1102, the campaign management server 150 receives a condition set 142 from a computing device 110 corresponding to a user 102 (e.g., marketer) for generating the campaign notification message. The condition set 142 may be stored in the campaign data store 862. The condition set 142 received at the server 1000 includes a defined campaign type selected by the user 102 (as illustrated in FIG. 2A at list 220 displayed at Screen 200). For instance, the defined campaign type selected by the user 102 may indicate any one of the following campaign types, including a promotional campaign, a survey campaign, a ratings campaign and an entertainment campaign. The condition set 142 received at the server 1000 further includes at least one PDD 134*a-n* located within the facility activated by the user 102 (as illustrated in FIG. 2B displayed at Screen 202). The activated PDD 134*a-n* is configured to detect a proximity of the shopper mobile computing device 130 corresponding to a shopper 132. The condition set 142 received at the server 1000 further includes at least one proximity-based delivery parameter indicating campaign content related to the defined campaign type selected by the user 102 (as illustrated in FIGS. 3A, 4A and 5 at Screens 300, 400 and 500, respectively). The campaign content is associated with a corresponding range of proximities in relation to the activated PDD 134*a-n*. For example, a first proximity-based (Far) delivery parameter 360 may indicate corresponding campaign content associated with a first range of proximities (e.g., 15-25 ft.) in relation to the activated PDD 134*a-n*; a second proximity-based (Near) delivery parameter 370 may indicate corresponding campaign content associated with a second range of proximities (e.g., 10-15 ft.) in relation to the activated PDD 134*a-n*; and a third proximity-based (Close) delivery parameter 380 may indicate corresponding campaign content associated with a third range of proximities (e.g., less than 10 ft.), as illustrated in FIG. 3A at Screen 300.

At operation 1104, the server 1000 receives proximity information 162 from the shopper mobile computing device 130 (as illustrated in FIG. 9 at the 'Transmit Proximity' signal). The proximity information 162 indicates a proximity of the shopper mobile computing device 130 in relation to the activated PDD 134*a-n*. At operation 1106, the server 1000 generates the campaign notification message 152 based upon the condition set 142 received from the computing device 110 and the proximity information 162 received from the shopper mobile computing device 130. For example, the campaign content associated with the corresponding range of proximities that includes the proximity of the shopper mobile computing device 130 in relation to the activated PDD 134*a-n* may be retrieved by the server 1000 and utilized for generating the campaign notification message for the defined campaign type. At operation 1108, the server 1000 transmits the campaign notification message 152 to the mobile computing device 130, wherein the campaign notification message 152 is displayed in a GUI 160 executed by the shopper mobile computing device 130. The displayed campaign notification message 152 may include an interactive graphic operative to receive an input by the shopper 132. For example, the interactive graphic may include an electronic coupon related to a product offered for sale within the facility (as illustrated in FIGS. 7B and 7C at Redeem Coupon buttons 722, 724, respectively), wherein the shopper mobile computing device 130 may store the electronic coupon within an offer data store 830. The interactive graphic may further include a set of generic answers related to an inquiry requested by the user 102 (as illustrated in FIG. 7B at the list of inquiries and answer selections 780). The interactive graphic may further include a rating selection for a specific product being offered for sale related to an inquiry by the user 102 requesting the shopper 132 to assess the specific product (as illustrated in FIG. 7C at the interactive rating graphic 778).

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
receiving, at a shopper mobile device in communication with a proximity detection device and a campaign management system, a first signal strength of a wireless signal transmitted from the proximity detection device to the shopper mobile device, the proximity detection device located within a retail facility and associated with a product offered for sale within the retail facility;
transmitting to a campaign management system, by the shopper mobile device, information indicating a first proximity of the shopper mobile device in relation to the proximity detection device associated with the product offered for sale within the retail facility and an identity of a shopper associated with the shopper mobile device, the first proximity based on the first signal strength of the wireless signal received at the shopper mobile device, wherein the campaign management system uses the identity of the shopper to verify that the shopper has rights to receive notification messages from the campaign management system;
receiving, at the shopper mobile device, a first campaign notification message from the campaign management system, the first campaign notification message based on the first proximity of the shopper mobile device in relation to the proximity detection device associated with the product;
displaying the first campaign notification message in a graphical user interface executed by data processing hardware of the shopper mobile device;
receiving, at the shopper mobile device, a second signal strength of the wireless signal transmitted from the proximity detection device to the shopper mobile device;
transmitting to the campaign management system, by data processing hardware of the shopper mobile device, information indicating a second proximity of the shopper mobile device in relation to the proximity detection device associated with the product offered for sale within the retail facility, the second proximity based on the second signal strength of the wireless signal received at the shopper mobile device;
receiving, at the shopper mobile device from the campaign management system, a second campaign notification message, the second campaign notification message based on the second proximity of the shopper mobile device in relation to the proximity detection device associated with the product, wherein the second campaign notification message is different from the first campaign notification message; and
displaying the second campaign notification message in the graphical user interface.

2. The method of claim 1, wherein the first proximity of the shopper to the product offered for sale within the retail facility is based on a proximity of the shopper mobile device to a proximity detection device located within the retail facility, the proximity detection device associated with the product offered for sale within the retail facility.

3. The method of claim 1, further comprising transmitting to the campaign management system, from the shopper mobile device, feedback information related to the first campaign notification message or the shopper.

4. The method of claim 3, wherein the feedback information comprises at least one of shopper demographics, shopper social media content, an indication of one or more products preferred by the shopper, or a purchase history of the shopper.

5. The method of claim 3, wherein the feedback information comprises at least one of a shopper response to a feedback request, a shopper rating or review of one or more products, a time stamp indicating when the first campaign notification message was transmitted to the shopper mobile device, or a shopper coupon redemption.

6. The method of claim 3, further comprising transmitting, to the campaign management system, from the shopper mobile device, second feedback information related to the second campaign notification message or the shopper.

7. The method of claim 1, further comprising:
receiving, at the shopper mobile device, a third signal strength of the wireless signal transmitted from the proximity detection device to the shopper mobile device;
transmitting to the campaign management system, from the shopper mobile device, information indicating a third proximity of the shopper mobile device in relation to the proximity detection device associated with the product offered for sale within the retail facility, the third proximity based on the third signal strength of the wireless signal received at the shopper mobile device;
receiving, at the shopper mobile device, a third campaign notification message, from the campaign management system, the third campaign notification message based on the third proximity of the shopper mobile device in relation to the proximity detection device associated with the product; and
displaying the third campaign notification message in the graphical user interface.

8. The method of claim 1, wherein the shopper mobile device executes a software application configured to communicate with the campaign management system.

9. The method of claim 1, wherein the first campaign notification message comprises an advertisement promoting one or more products.

10. The method of claim 1, wherein the first campaign notification message indicates availability of the product offered for sale.

11. A shopper mobile device for enhancing an experience of a shopper, the system comprising:
data processing hardware; and
memory hardware in communication with the data processing hardware, the memory hardware storing instructions that when executed on the data processing hardware cause the data processing hardware to perform operations comprising:
receiving, at the shopper mobile device in communication with a proximity detection device and a campaign management system, a first signal strength of a wireless signal transmitted from the proximity detection device to the shopper mobile device, the proximity detection device located within a retail facility and associated with a product offered for sale within the retail facility;
transmitting, to the campaign management system, information indicating a first proximity of the shopper mobile device in relation to the proximity detection device associated with the product offered for sale within the retail facility and an identity of the shopper associated with the shopper mobile device, the first proximity based on the first signal strength of the wireless signal received at the shopper mobile device, wherein the campaign management system uses the identity of the shopper to verify that the shopper has rights to receive notification messages from the campaign management system;
receiving, from the campaign management system, a first campaign notification message, the first campaign notification message based on the first proximity of the shopper moible device in relation to the proximity detection device associated with the product;
displaying the first campaign notification message in a graphical user interface executed by the data processing hardware;
receiving, at the shopper mobile device, a second signal strength of the wireless signal transmitted from the proximity detection device to the shopper mobile device;
transmitting, to the campaign management system, information indicating a second proximity of the shopper mobile device in relation to the proximity detection device associated with the product offered for sale within the retail facility, the second proximity based on the second signal strength of the wireless signal received at the shopper mobile device;
receiving, from the campaign management system, a second campaign notification message, the second campaign notification message based on the second proximity of the shopper mobile device in relation to the proximity detection device associated with the, wherein the second campaign notification message is different from the first campaign notification message; and
displaying the second campaign notification message in the graphical user interface.

12. The shopper mobile device of claim 11, wherein the first proximity to the product offered for sale within the retail facility is based on a proximity of the shopper mobile device to a proximity detection device located within the retail facility, the proximity detection device associated with the product offered for sale within the retail facility.

13. The shopper mobile device of claim 11, wherein the operations further comprise transmitting, to the campaign management system, feedback information related to the first campaign notification message or the shopper.

14. The shopper mobile device of claim 13, wherein the feedback information comprises one of: shopper demographics; shopper social media content; indication of one or more products preferred by the shopper; or purchase history of the shopper.

15. The shopper mobile device of claim 13, wherein the feedback information comprises one of: shopper response to a feedback request; shopper rating or review of one or more products; time stamp indicating when the first campaign notification message was transmitted; or shopper coupon redemption.

16. The shopper mobile device of claim 13, wherein the operations further comprise transmitting, to the campaign management system, second feedback information related to the second campaign notification message or the shopper.

17. The shopper mobile device of claim 11, wherein the operations further comprise:
transmitting, to the campaign management system, information indicating a third proximity of the shopper mobile device in relation to the proximity detection device associated with the product offered for sale within the retail facility;

receiving, from the campaign management system, a third campaign notification message, the third campaign notification message based on the third proximity of the shopper mobile device in relation to the proximity detection device associated with the product; and
displaying the third campaign notification message in the graphical user interface.

18. The shopper mobile device of claim 11, wherein the data processing hardware resides on a shopper mobile device associated with the shopper and executes a software application configured to communicate with the campaign management system.

19. The shopper mobile device of claim 11, wherein the first campaign notification message comprises an advertisement promoting one or more products.

20. The shopper mobile device of claim 11, wherein the first campaign notification message indicates availability of the product offered for sale.

\* \* \* \* \*